(12) United States Patent
Siegler

(10) Patent No.: US 8,108,317 B2
(45) Date of Patent: Jan. 31, 2012

(54) SYSTEM AND METHOD FOR RESTRICTING ACCESS TO A TERMINAL

(75) Inventor: Thomas Arthur Siegler, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1771 days.

(21) Appl. No.: 11/301,633

(22) Filed: Dec. 13, 2005

(65) Prior Publication Data

US 2007/0067634 A1    Mar. 22, 2007

Related U.S. Application Data

(60) Provisional application No. 60/712,787, filed on Aug. 31, 2005.

(51) Int. Cl.
*G06Q 20/00* (2006.01)

(52) U.S. Cl. ............... 705/65; 705/51; 705/52; 705/57; 705/59; 705/64; 380/25; 713/167; 713/187; 713/193

(58) Field of Classification Search .............. 705/51–65; 380/25; 713/167, 187, 193
See application file for complete search history.

(56) References Cited

U.S. PATENT DOCUMENTS

| | | | | |
|---|---|---|---|---|
| 5,671,412 A | * | 9/1997 | Christiano | 1/1 |
| 6,327,578 B1 | * | 12/2001 | Linehan | 705/65 |
| 7,013,286 B1 | * | 3/2006 | Aggarwal et al. | 705/14.26 |
| 7,133,845 B1 | * | 11/2006 | Ginter et al. | 705/51 |
| RE40,444 E | * | 7/2008 | Linehan | 705/65 |
| 2006/0168447 A1 | * | 7/2006 | Pailles et al. | 713/176 |

* cited by examiner

*Primary Examiner* — Pierre E. Elisca
*Assistant Examiner* — Shahid Kamal
(74) *Attorney, Agent, or Firm* — Hiscock & Barclay, LLP

(57) ABSTRACT

A method for authenticating data comprising the steps of: providing data to a first device having at least two initial cryptographic keys; generating authentication information required to authenticate the data utilizing the at least two initial cryptographic keys; sending the data and authentication data to a second device having paired cryptographic keys wherein each paired cryptographic key is associated to one of the at least two initial cryptographic keys; and authenticating the data in the second device utilizing the paired cryptographic keys.

30 Claims, 15 Drawing Sheets

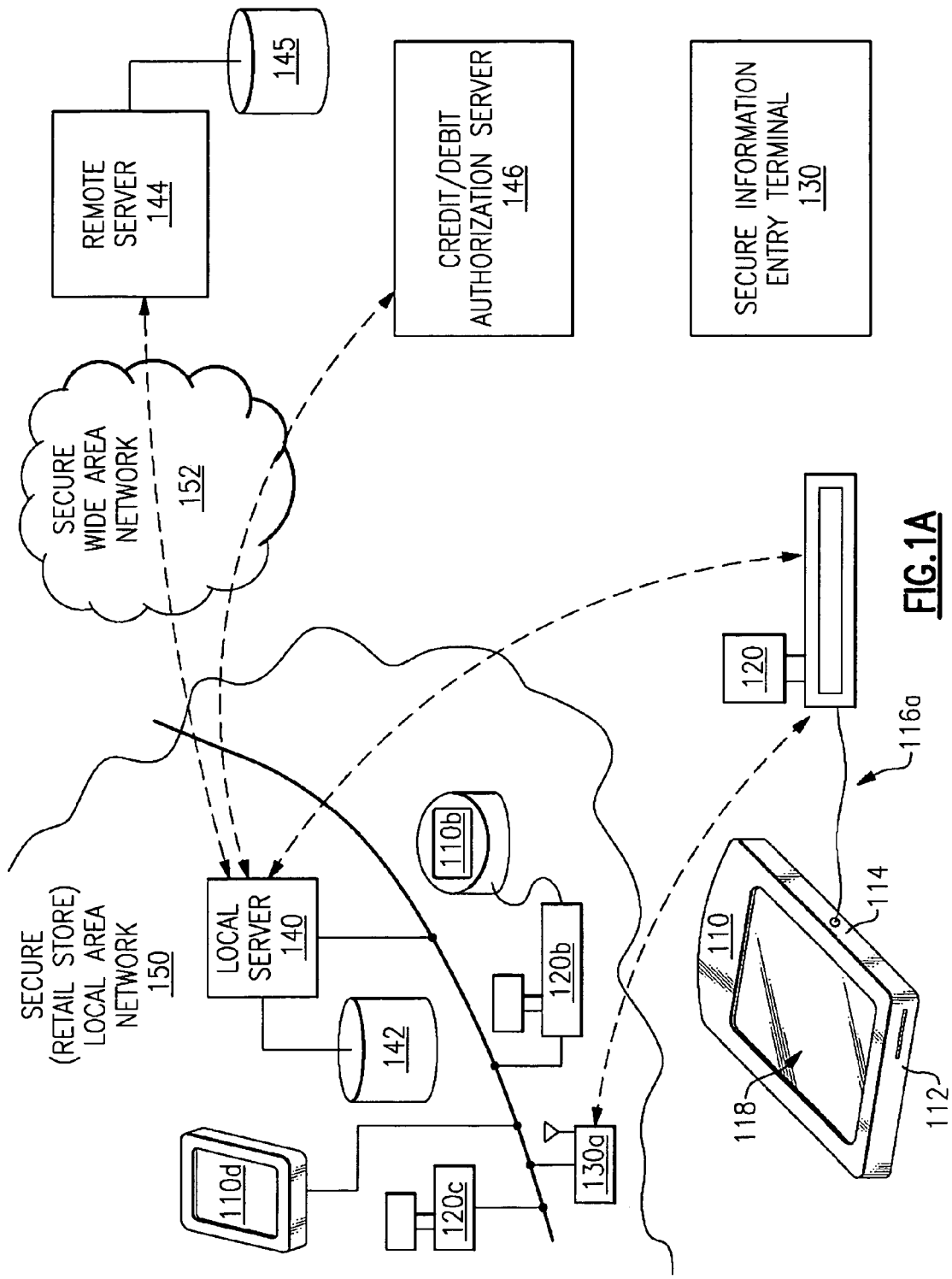

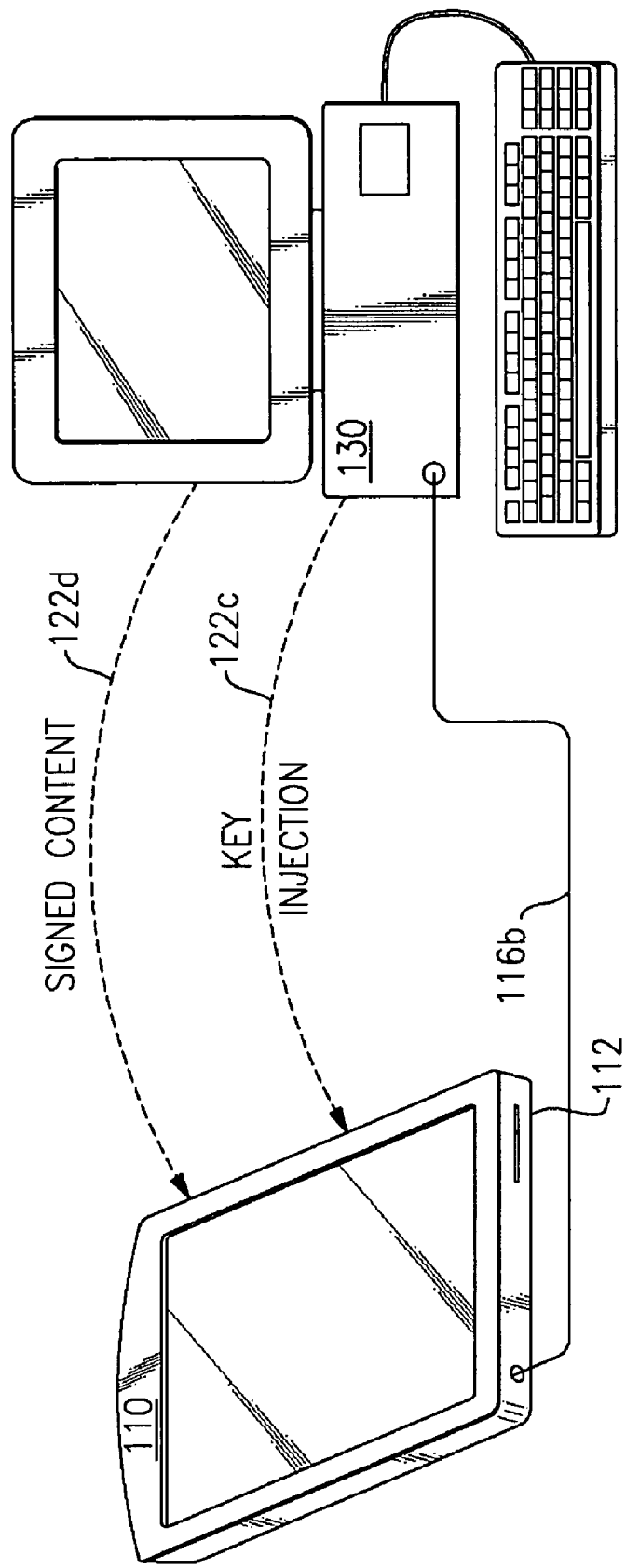

| TOKEN SET | (PRIVATE/PUBLIC) TOKEN A | (PRIVATE/PUBLIC) TOKEN B | ... | TOKEN N |
|---|---|---|---|---|
| 1  510 | 410r/410u | 412r/412u | ... | |
| 2  514 | 414r/414u | 416r/416u | ... | |
| 3  518 | 418r/418u | 420r/420u | ... | |
| 4  522 | 422r/422u | 424r/424u | ... | |
| 5  526 | 426r/426u | 428r/428u | ... | |

FIG.3C

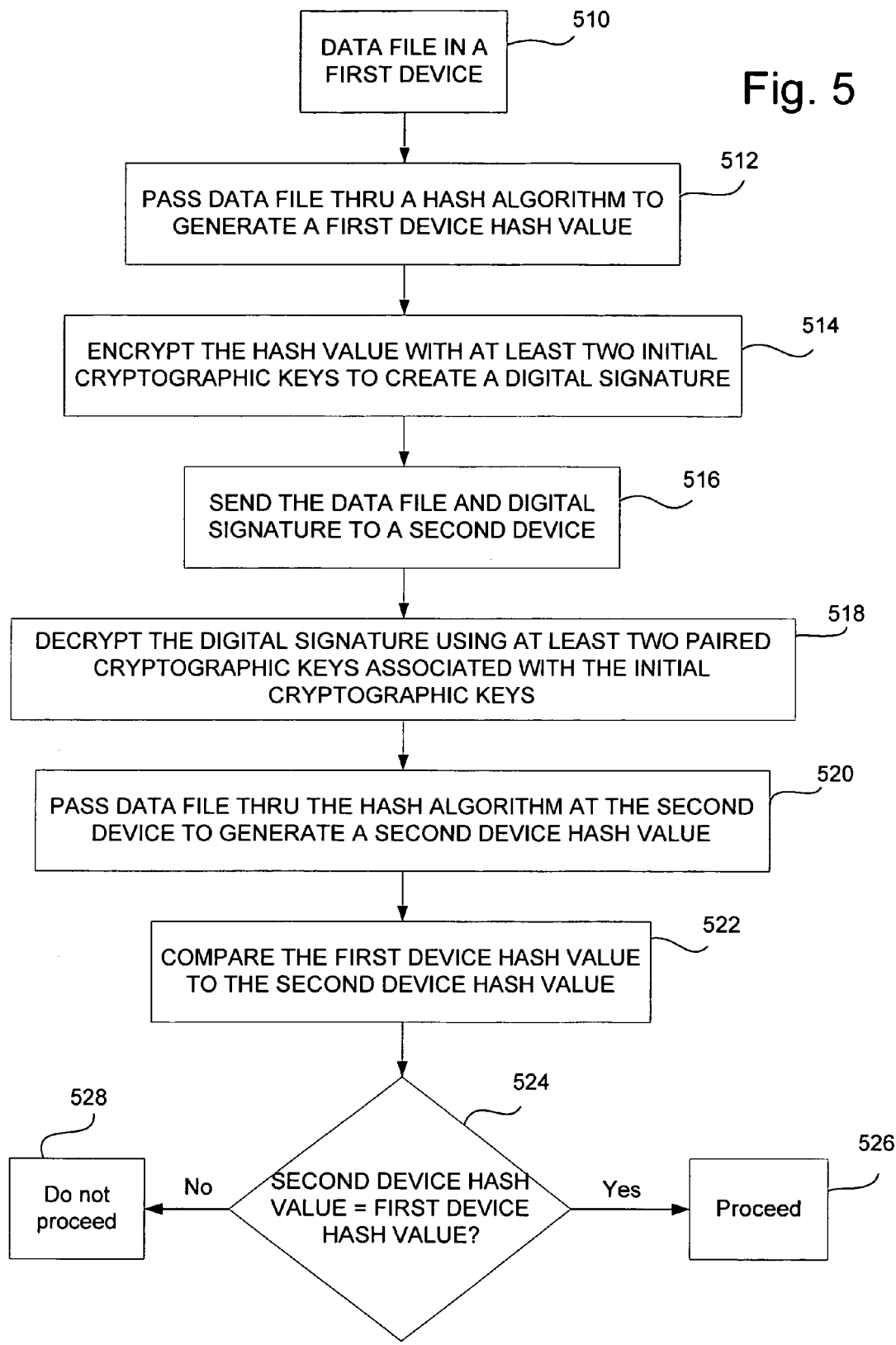

SYSTEM AND METHOD FOR RESTRICTING ACCESS TO A TERMINAL

PRIORITY

This patent application claims priority of provisional U.S. patent application Ser. No. 60/712,787 filed Aug. 31, 2005 and that is titled "PED B Utilities Engineering Specification", which is incorporated herein by reference in its entirety.

FIELD OF THE INVENTION

This invention relates generally to a system, an apparatus and a method for restricting access to and control of a computing device, and more particularly a system, an apparatus, and a method for restricting access to and control of a computing device which may be used for performing transactions, such as financial transactions at a point of sale.

BACKGROUND

Devices that perform financial transactions, also referred to herein as financial transaction devices, are generally at risk from being misused to perform criminal activity. Financial transaction devices are typically designed with various security features that defend against this type of risk. One type of security feature is to require each user of the device to enter a user code, such as a personal identification number (PIN), along with other transaction related information as a precondition for using the device to execute a financial transaction. A device that requires an entry of a PIN as a pre-condition of its use is generally referred to as a PIN Entry Device (PED).

The PIN and other transaction related information are typically encrypted using a PIN encryption and cryptographic key and transmitted by the device to a host computer. The host computer attempts to verify that the encrypted PIN and other transaction data are correct, and if correct, further processes the transaction. The encrypted PIN and other transaction data is "correct" if it associates with an account number typically referenced within the transaction data.

A transaction typically involves a buyer and a seller. Processing the transaction may involve debiting an account of a buyer in the transaction (typically the user of the PED) and crediting an account of the seller of the transaction (typically a retail store business entity supplying the PED). The encryption of the PIN and the other transaction data prior to transmission of the data protects against revealing the unencrypted data to parties that may be listening (eavesdropping) and/or intercepting the data during its transmission or processing.

BRIEF DESCRIPTION OF THE DRAWINGS

For a further understanding of these and objects of the invention, reference will be made to the following detailed description of the invention which is to be read in connection with the accompanying drawing, wherein:

FIG. 1A illustrates an overview of an exemplary embodiment of a retail store system including a PED financial transaction terminal that processes financial transactions in accordance with the invention.

FIG. 1C illustrates an exemplary embodiment of an inter-operation between a PED financial transaction terminal and a SIE terminal.

FIG. 3C is a table listing the content of (5) token sets with respect to individual tokens and encryption keys.

FIG. 5 is a flowchart for restricting access to and control of a computing device in accordance with the invention.

DETAILED DESCRIPTION

Figure 1B:
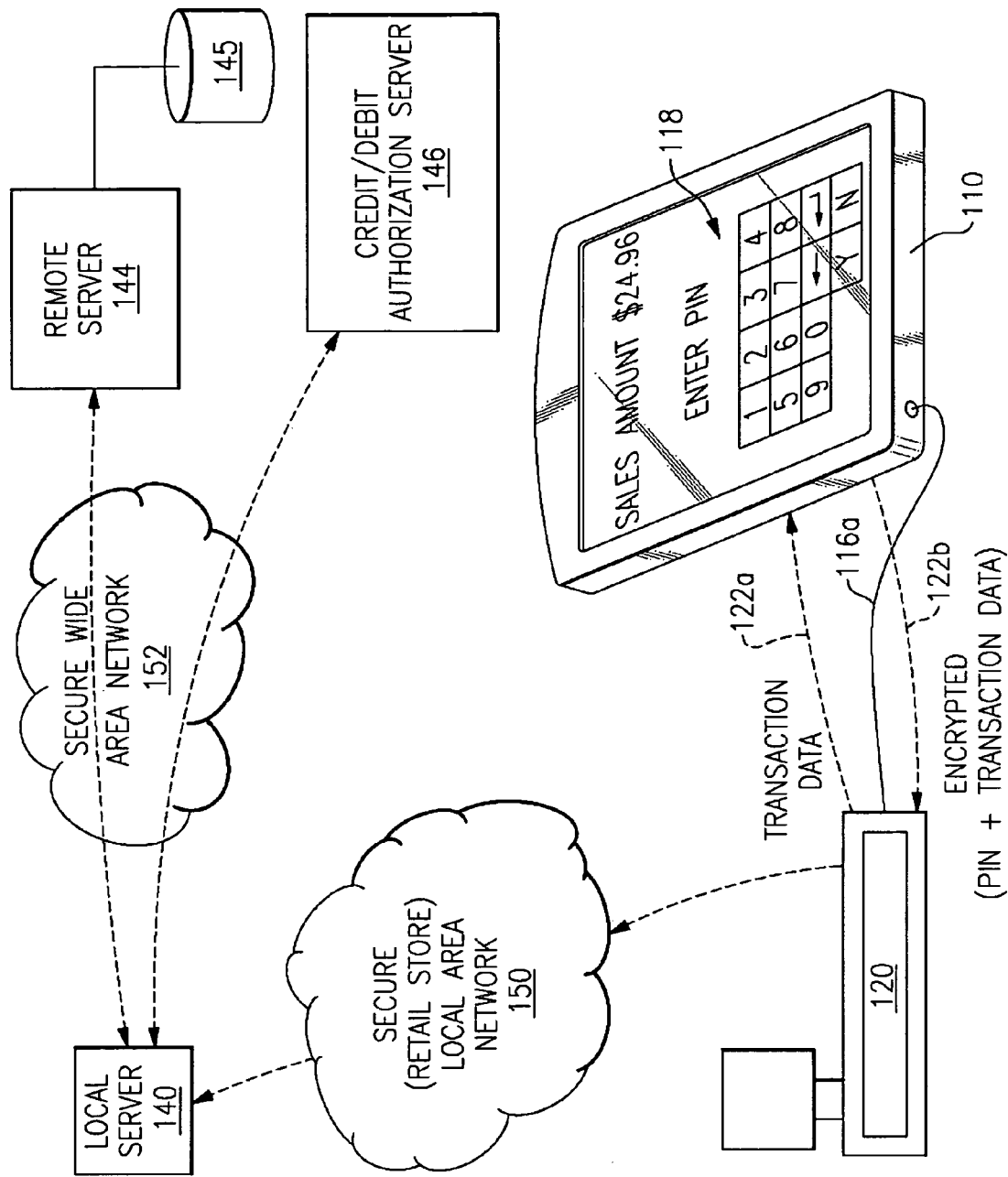
FIG. 1B illustrates an exemplary embodiment of the interoperation between a PED financial transaction terminal and an electronic cash register during the execution of a financial transaction.

FIG. 1A illustrates an overview of an exemplary embodiment of a retail store system including a PED financial transaction terminal 110 that processes financial transactions in accordance with the invention. The PED financial transaction terminal 110 is of a type commonly used in processing point-of-sale credit card transactions. The terminal 110 includes a housing having a card reader 112 and a communications port 114, a contact sensitive touch screen 118 and a communications link 116a to another device, such as to a cash register 120. The contact sensitive touch screen 118 functions as a keypad. In other exemplary embodiments, the terminal 110 includes a separate or integrated physical keypad (not shown), modem, and may not include a card reader.

As shown, other PED financial transaction terminals 110b, 110d are configured to communicate, directly or indirectly, over a local network 150 located within the confines of a retail store. The transaction terminal 110, communicates indirectly over the local area network 150 via the cash register 120. The local network 150 can also include a wireless (802.11) access point 130a and other cash registers 120b and 120c.

A local server 140 that is directly connected to the local network 150 and to one or more mass storage devices 142 communicates with other remotely located servers, such as a remote server 144 associated with the retail store and a credit and/or debit authorization server 146 over a wide area network 152. This type of arrangement can be scaled to include and support hundreds of transaction terminals 110 and cash registers 120, multiple local networks 150, local servers 140 and remote servers 144.

FIG. 1B illustrates an exemplary embodiment of the inter-operation between a PED financial transaction terminal 110 and an electronic cash register 120 during the execution of a financial transaction. To execute a transaction, the operation of a cash register causes various communications of transaction data 122a, such as a sales transaction amount, from the cash register 120 to the transaction terminal 110 via the communications link 116a. The communications link can be a universal serial bus (USB), an RS-232 serial communications cable, a wireless IEEE 802.11 communications channel or other channel. In other exemplary embodiments, the transaction terminal 110 communicates with the cash register 120 via the local network 150 without employing the communications link 116a.

In some exemplary embodiments, the transaction terminal 110 displays the transaction amount to a user of the transaction terminal 110. The user of the transaction terminal, typically a buyer in the transaction, communicates an approval of the transaction amount via the terminal 110. In an exemplary embodiment, the user presses a "Yes" key on the contact sensitive touch screen 118 or keypad (not shown) to communicate approval and presses a "No" to communicate non-approval.

Upon approval from the user, the terminal 110 prompts the user to enter a PIN value. The user inputs a PIN value by pressing a series of numerically labeled keys and by finally pressing an enter key displayed onto contact sensitive touch screen 118. In other exemplary embodiments, a PIN is entered before the user approves the amount.

The transaction terminal 110 encrypts and communicates information 122b, including the inputted PIN value and other transaction related data to the cash register 120. The cash register 120 communicates the encrypted information to a local server 140 via the local network 150. The local server 140 communicates the encrypted information to a credit/debit authorization server 146, a remote server 146 owned by the retailer via the wide area network 152, or a service provider. In some exemplary embodiments, the encrypted information is communicated to a remote server 146 owned by the retailer and then re-transmitted from the remote server 146 to a credit/debit authorization server 146.

The credit/debit authorization server 146 determines whether the encrypted PIN value and the other transaction related data are correct, such as being associated with a credit/debit account number referenced by the transaction related data. The credit/debit server may perform other data checks such as for available balance. If correct, the credit/debit authorization server 146 debits the account of the buyer (user) and credits the account of the seller (retailer) and communicates approval information to the terminal 110 via the wide area network 152, the local server 140, the local are network 150 and the cash register 120. In many cases, the retailer's account resides at a different location. In these cases, a credit advice is sent to the server holding the retailer's account. In some circumstances, one or more servers may be offline and the processing of the transaction may be delayed or altered as relative to the description above.

The local server communicates the approval information to the remote server 144. The remote server 144 records the transaction within the retailer's (sellers) digital records 145, for the purpose of maintaining records including, for example, accounts receivable and inventory control records. The terminal 110 displays information indicating the transaction approval to the user (not shown) and or a cash register.

FIG. 1C is an exemplary embodiment of the present invention illustrating inter-operation between a PED financial transaction terminal 110 and a secure information entry (SIE) terminal 130. Terminal 110 will not process any data that has not been determined to be authentic or authenticated. Other types of devices, or transaction devices such as computers, displays, ATMs, etc. are within the scope of the present invention. An SIE terminal is a device that has the capability to perform one or more functions, such as digitally sign data, transmit and receive data, authenticate data, store encryption or cryptographic keys, store data, execute programs, etc. It may be a personal computer, a server, a network computer, etc. The data may include graphics, multimedia, payment information, access requests, user identity information, contract information, credit information, debit information, textual information, executable programs, software, communications initiation data, etc. Data may be configured different ways, such as being provided in a data file or provided as a stream of data (streaming data), special purpose device, etc.

The SIE terminal 130 digitally signs data files containing programs and/or data utilizing a Signing Utility program such as are available with various Public Key Infrastructure software systems or smart card-based security tokens to create a file header by processing the data file and one or more encryption key(s). The result is generally referred to as a digital signature. A digital signature may be created by processing the data file and one or more encryption key(s) through a digital signature algorithm. A second digital signature may be created by processing the data file and one or more additional encryption key(s), wherein at least one of the encryption key(s) that is processed to create the second digital signature is different than any of the encryption key(s) in the first digital signature. Alternatively, processing the data file and one or more encryption keys through a different algorithm than that used in the first digital signature may create a second digital signature. The encryption key(s) may be secret keys, private keys, or public keys, but in an exemplary embodiment provided herein, they will be described as private keys.

Once computed, the file header and its associated data is communicated as a digitally signed data 122d to the terminal 110 via a communications link 116b. The terminal 110 receives the digitally signed data and authenticates the signed data by verifying the authentication data in the file header. The authentication data in the file header is verified by using one or more encryption key(s) that are associated with the initial encryption key(s), which the SIE 130 used to create the digital signatures. These encryption key(s) may be secret keys, private keys, or public keys, but in the description of an exemplary embodiment herein, they will be described as public keys.

It is to be noted that the encryption keys of the first and second devices may be associated by mathematical derivation, symmetry, or other relationship.

In this exemplary embodiment, the authentication data is recomputed in the receiving terminal 110 and compared to the authentication data generated by the SIE 130. In this embodiment, the algorithm used by the SIE 130 is reversed to decrypt the digital signature.

The file header and digital signature may be stored and communicated separate from the data. The signed data may include multiple digital signatures.

Prior to being placed into normal operation, the public encryption key(s) is transmitted 122c to the terminal 110 from the SIE terminal 130 via the execution of a Key Injection Utility program. In some exemplary embodiments, the public encryption key(s) is transmitted to the terminal from a server or other device. The public encryption key(s) and its associated private encryption key(s) are generated from the SIE terminal 130 via the execution of a Key Generation Utility program. The SIE terminal 130 interoperates with the financial transaction terminal 110 in order to secure data transmission. Other sources of private/public key(s) generation and/or management may be employed. It is to be noted that the data file itself need not be encrypted or otherwise protected in order for secure data transmission to be accomplished in accordance with the present invention.

Figure 2A:
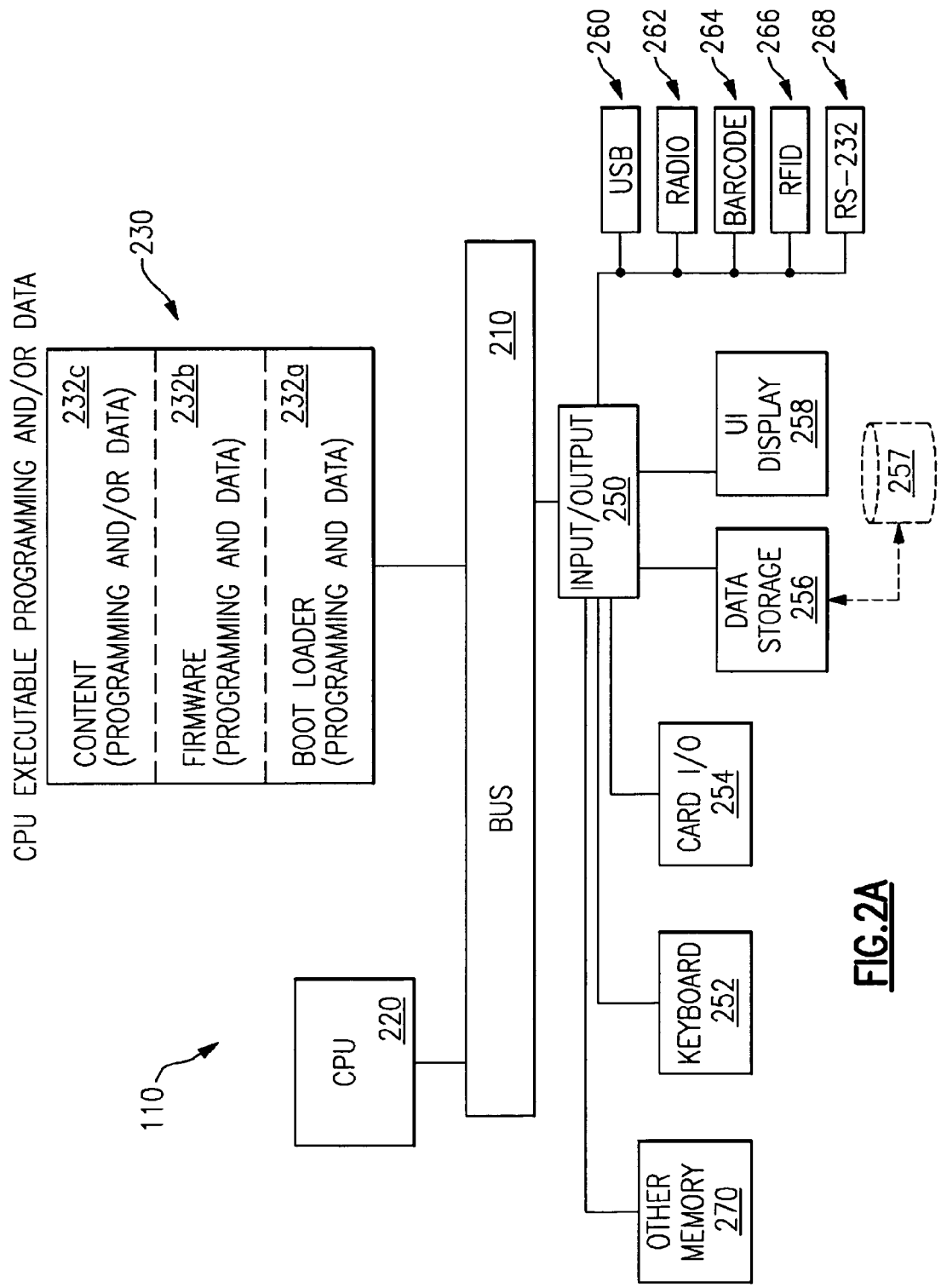
FIG. 2A is a block diagram illustrating some of the internal components of an exemplary embodiment of a financial transaction terminal in accordance with the invention.

FIG. 2A is a block diagram illustrating an exemplary financial transaction terminal 110 which includes a central processing unit (CPU) 220, memory 230, and an input/output (I/O) interface 250 which are connected via a bus 210.

The input/output interface 250 is electronically connected to a virtual keypad 252 (such as a contact sensitive touch screen 118), a card reader 254, one or more data communications ports including a USB port 260, a radio (IEEE 802.11) port 462, a bar code reader 264, and RFID port 266 and an RS-232 serial communications port 268. The input/output interface 250 is also connected to a user interface display 258. Optionally, the terminal 110 can include data storage 256 such as a disk storage device (257) or flash memory. Other exemplary embodiments of the transaction terminal 110 can include other combinations and variations of hardware and software.

CPU 220 substantially controls transaction terminal 110. The CPU is also referred to as a primary CPU. In some exemplary embodiments, the terminal 110 may include additional processors. CPU 220 executes instructions and/or processes data fetched from the memory 230 storing authenticated, unrestricted and executable programming and/or data. In some exemplary embodiments, the memory stores unrestricted executable programming and/or data which is physically secure (via tamper resistant hardware or software), nonvolatile and implemented as flash memory.

The first instructions fetched and executed by CPU may reside within a boot loader program 232a stored within memory 230. During its execution, the boot loader program 232a transfers direction of the CPU 220 to a firmware program 2302b.

The boot loader program 232a and firmware program 232b are authenticated, flagged as unrestricted and installed into the memory 230 during manufacture of the transaction terminal 110, or at a later time. Under certain conditions, the firmware 232b is configured to transfer the direction of the CPU to one or more other programs 232c-232n. The firmware program 232b will not transfer the direction of the CPU 220 to instructions residing within another programming module, unless the other programming module is first authenticated by the firmware 232b and optionally flagged or classified as unrestricted and stored in memory 230. If authentication fails, the other programming module may be flagged as restricted and stored into memory 260 or discarded.

Figure 2B:
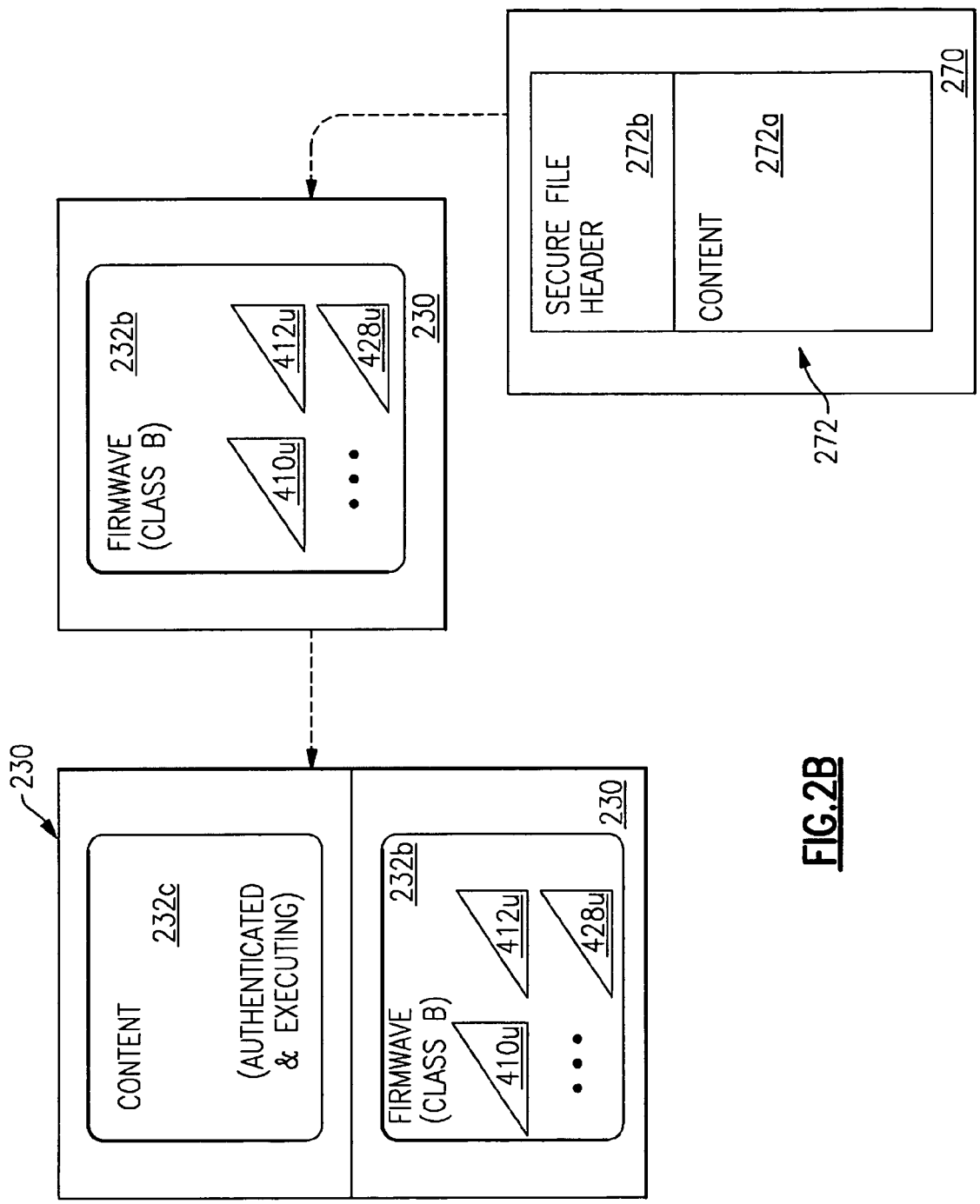
FIG. 2B is a block diagram illustrating firmware performing authentication of data signed with one or more signature encryption keys.

The other authenticated programming module may alternatively be stored but not additionally flagged because the act of storing may indicate authentication so that modules that are not authenticated are not stored. Programming modules may be authenticated prior to each execution. Other programming modules may be executed without authentication. For instance, FIG. 2B is a block diagram illustrating firmware performing authentication and execution of data signed with one or more of the private signature key(s). As shown, the firmware program 232a is authenticated and installed onto the terminal 110 during the manufacturing of the terminal 110 or at a later time before use by an end user.

The firmware 232b may be pre-installed with one or more public encryption keys. The terminal 110 is typically injected with one or more public encryption keys 410u-428u from the SIE terminal 130. As shown, the firmware 232b of the terminal 110 was injected with ten public encryption keys 410u-428u after the firmware was installed onto the terminal 110. The one or more public encryption keys may be transmitted to the terminal after it is installed or by an intermediate service provider.

A file 272 including a data file 272a and a file header 272b is communicated from the SIE terminal 130 and stored in the transaction terminal 110 in memory 230, 270. The firmware program 232a accesses the file 272 and attempts to authenticate a first digital signature (not shown) and a second digital signature (not shown) stored within the file header 272b. The first and second digital signatures have been previously generated by the SIE terminal 130 executing the Signing Utility. The authentication process may occur while the file is loaded. The authentication process proceeds until the completed file is received.

In an exemplary embodiment, the first and second private keys used to construct the first and second digital signatures have been selected from within a larger set of N private keys (such as 10 or more) and referred to as "2 of N" signing where N represents the total number of private keys within the larger set of private keys. An advantage of having a large set of these keys in the first device is that it provides flexibility in use of the system should a key become compromised in some way. If a key is compromised, it can be erased, invalidated, retired, etc. from use. With a large set of keys, other keys may then be utilized in substitution for the compromised keys, making other changes, such as injection of additional keys unnecessary.

Figure 3A:
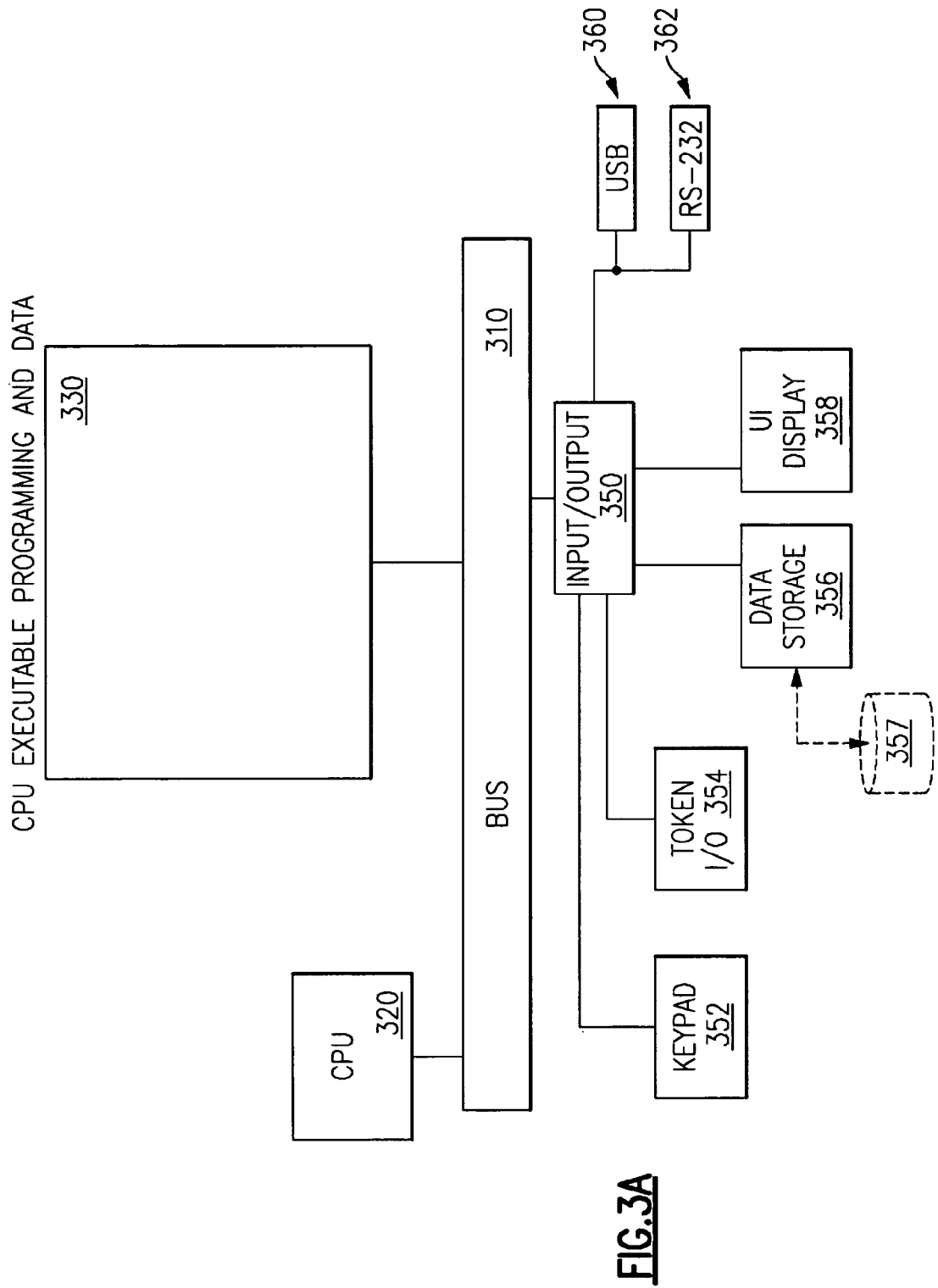
FIG. 3A is a block diagram illustrating some of the internal components of an exemplary embodiment of a SIE terminal in accordance with the invention
Figure 3B:
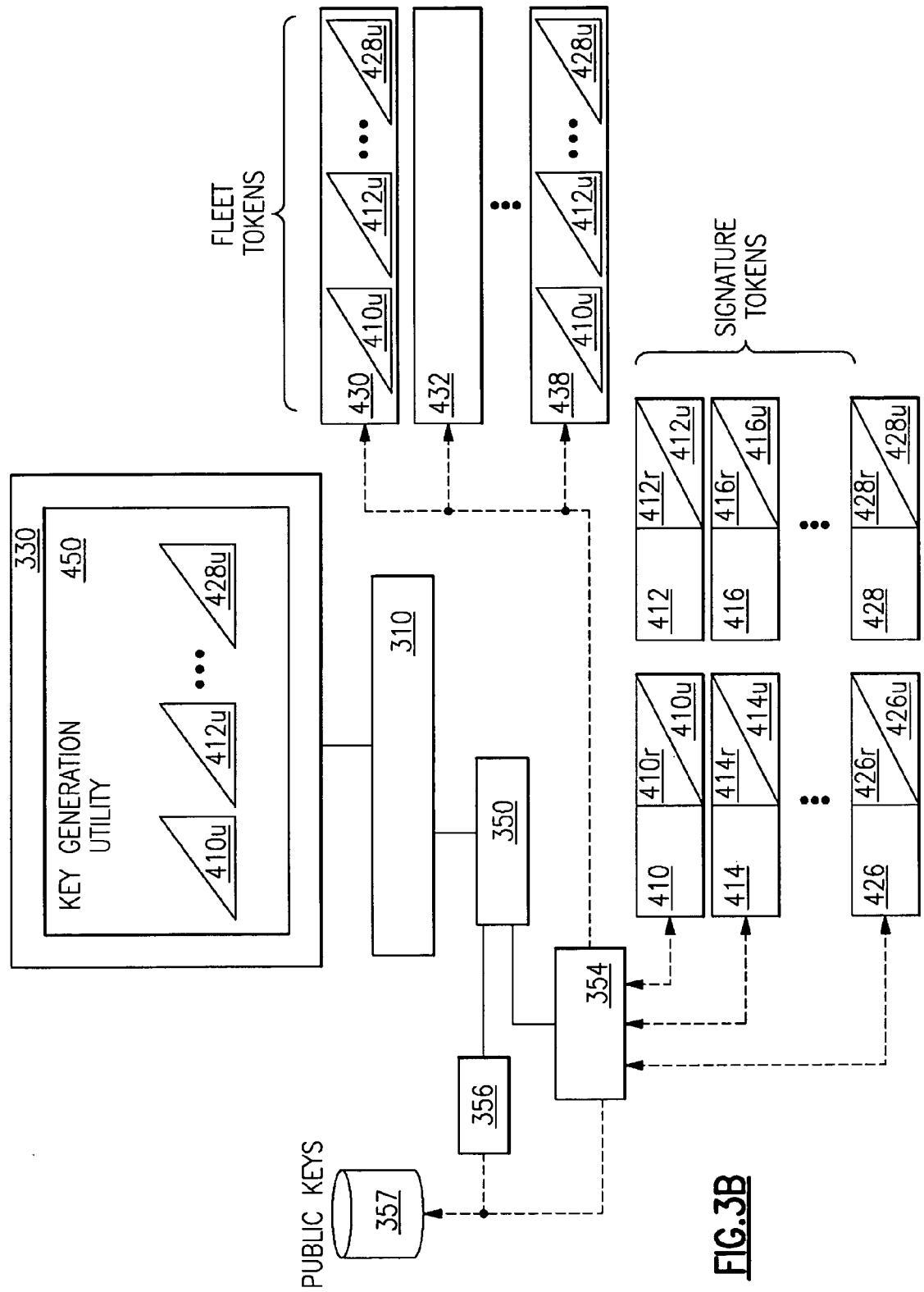
FIG. 3B is a block diagram illustrating a process of generating pairs of associated encryption keys from a plurality of signature tokens and the process of storing a copy of each of the generated encryption keys onto one or more fleet setup tokens and/or into a data file.
Figure 3D:
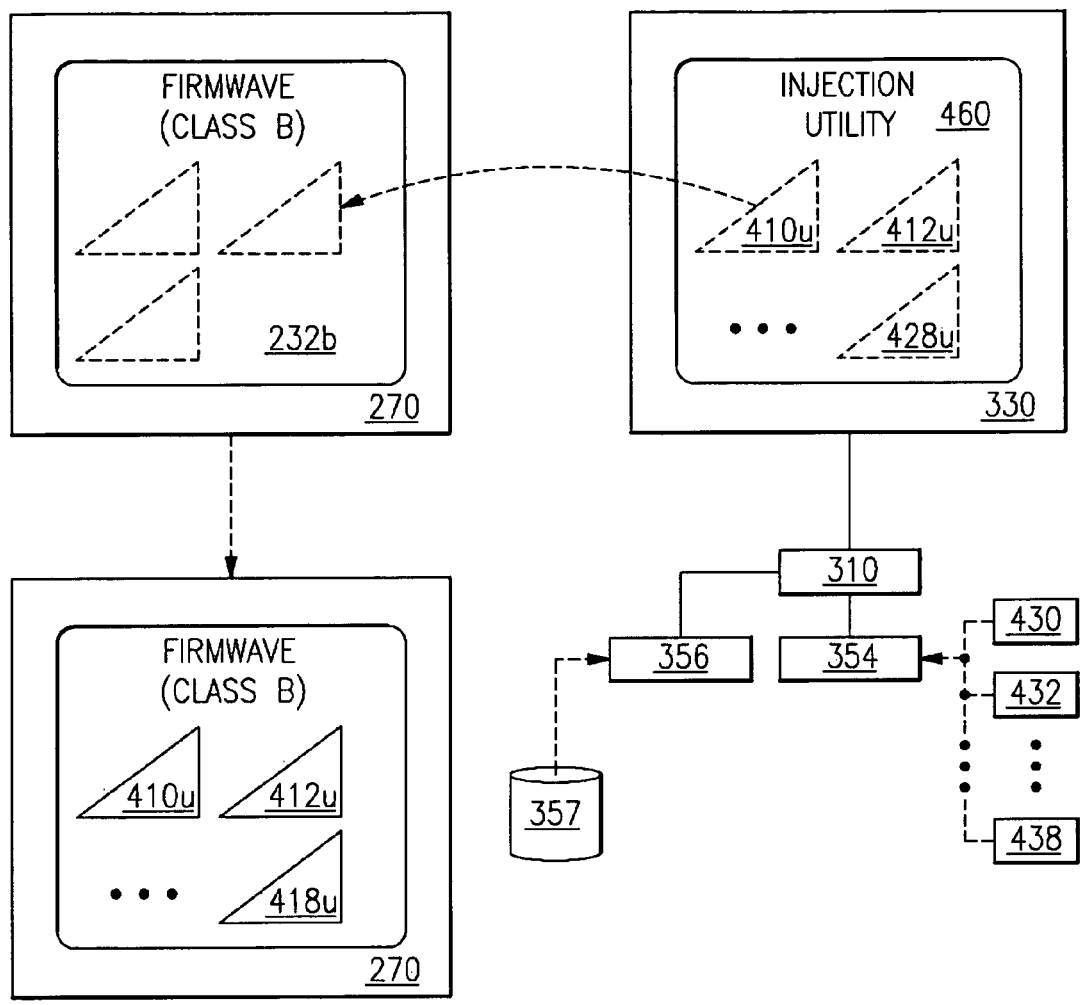
FIG. 3D is a block diagram illustrating a SIE terminal injecting encryption keys of all available signature tokens to the firmware of a PED financial transaction terminal.
Figure 3E:
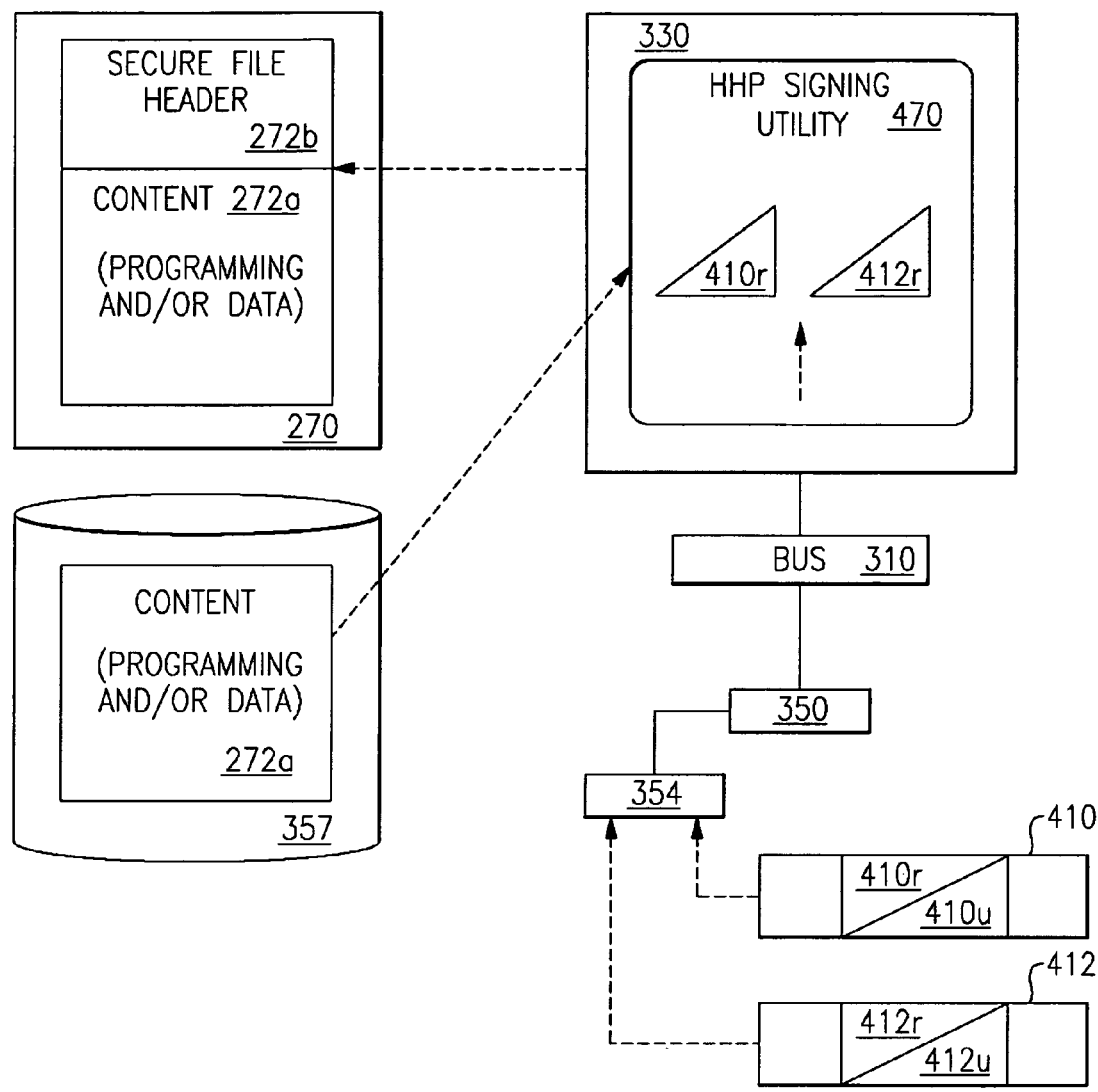
FIG. 3E is a block diagram illustrating an exemplary embodiment of the SIE terminal signing a data file using the private encryption keys of each of the signature tokens of token set 1.

The first digital signature residing within the file header 272b was previously generated from a hashing algorithm and a private encryption key 410r (FIGS. 3C and 3E). The second digital signature was previously generated from a private encryption key 412r (FIGS. 3C and 3E). The larger set includes the (10) private keys identified as 410r-428r (FIG. 3C).

The firmware program 232a attempts to authenticate the first digital signature using public encryption key 410u. If successful, the firmware program 232a attempts to authenticate the second digital signature using public encryption key 412u. If successful, the firmware program 232a tests for correctness of other information within the file header 272b. The private and public keys may be generated in accordance with encryption standards, such as Elliptic Curve Cryptosystem or RSA Cryptosystem.

The first and second public keys used to authenticate the first and second digital signatures respectively, may be identified as two public keys included within a larger set of public keys that are each associated with a first and second private key of a set of private keys. The firmware 232a is configured to authenticate digital signatures using the other public keys included within the larger set of public keys, if necessary. This type of exemplary embodiment is referred to as "2 of N" authentication where N represents the number of public keys within the larger set of private/public cryptographic key pairs. Cryptographic keys are referred to as being paired when they are related to each other or associated with each other mathematically or in some other way.

If the digital signatures are authentic and other information within the file header 272b is correct, the program and/or data 272a is flagged as authenticated and executable and copied into the memory 230 storing unrestricted data 232c. When appropriate, direction of the CPU 220 is transferred to the data 232c residing in memory 230 from the firmware program 232a, in accordance with instructions executing within the firmware program 232a.

When appropriate, direction of the CPU 220 is transferred back to the firmware program 232b or to another authenticated and unrestricted program, in accordance with instructions executing within the data 232c or in accordance with interrupts generated from hardware or other digital logic within the terminal 110.

If either of the digital signatures associated with the data 272a is not determined to be authentic, it will not be permitted to control CPU 220. Only authenticated programs are permitted to control the CPU.

Authenticated programs may or may not be permitted to transfer control of the CPU to the program 232c. If, for example, transfer is not permitted and the program 232c is an executable file, it will not be executed or if the program 232c is a script file, it will not be interpreted or if the program 232c is data, it will not be input or processed. Otherwise, control may be transferred if the other program is authenticated.

If both of the digital signatures are determined to be authentic, control of the CPU 220 will be permitted to be transferred to the program 232c so that executable files will be permitted to execute, script files will be permitted to be interpreted by an authenticated script interpreter program and data files will be permitted to be input and processed by an authenticated program.

While being active, firmware 232b (or other type of digital logic containing data 232c) is permitted to perform actions to process or to transfer control of the CPU 220 to other firmware that was authenticated before the time of performing such actions.

The active firmware is best not permitted to execute the other inactive firmware (as an executable file), best not permitted to interpret the other inactive firmware (as a script file) and best not permitted to process the other inactive firmware (as data) if the other inactive firmware was not authenticated prior to the time of its transferring control of the CPU by the active firmware.

If the other inactive firmware is detected to have been last modified at a time later than a time that it was last authenticated, the other inactive firmware is no longer authenticated. All firmware or data must be authenticated prior to being activated or being processed by other activated programs and later than the time of its last modification.

Newly delivered firmware, can replace presently installed (previously delivered) firmware after the newly delivered firmware is determined to be authentic (authenticated). For example, a first bitmap file named "icon.bmp", that is delivered and authenticated can be replaced by a second bitmap file named icon.bmp that is delivered and authenticated. A newly delivered program that is delivered and authenticated can input and process the second bitmap file icon.bmp.

Likewise, newly delivered firmware can replace presently installed (previously delivered) firmware 232b of the terminal 110, after the newly delivered firmware is authenticated. The CPU that controls terminal 110 is also referred to as the primary CPU. The firmware that initiates control of the behavior of the primary CPU is referred to as primary firmware.

In some exemplary embodiments, the terminal 110 includes one or more processors (CPU's) in addition to a primary CPU to execute authenticated firmware and which CPU is utilized to process other authenticated data. Additional processors may be included. Optionally, the terminal 110 can interoperate with a CPU included within a peripheral that is attached to the terminal 110, such as a smart card and its associated reader. Additional CPU's are referred to as non-primary CPU's, or referred to individually as a secondary or tertiary CPU. An additional CPU may have its own firmware, which is referred to as non-primary firmware or referred to individually as secondary or tertiary firmware. To replace a particular copy of firmware, a data type field stores a value that indicates that its associated data is to be installed as primary, secondary or tertiary firmware.

Firmware may be authenticated in a manner different than that for other types of digital logic. Firmware, whether primary, secondary, or tertiary, may be authenticated using one or more cryptographic keys that are different from the cryptographic keys used for other types of data.

One or more secret or private cryptographic keys, in the possession of a manufacturer of the terminal may be used to sign data that is intended by the manufacturer to be installed as firmware within the terminal 110. At least one public cryptographic key that is cryptographically paired with respect to the firmware private key is utilized by the presently installed primary firmware 232b to authenticate any newly delivered data that is intended to be installed as firmware. Alternatively, one or more symmetric secret keys may be employed.

The file header 272b may include a data type field that stores a value to indicate a classification (type) of its associated data 272a. The data type field can indicate that the data is firmware, an executable program, an interpreted program, data, a specific type of firmware (primary, secondary or tertiary), a specific type of program (executable or specific script language), or a specific type of data, etc. To deliver data to replace primary, secondary or tertiary firmware, the data type field stores a value that indicates that its associated data is to be installed as primary, secondary, or tertiary firmware, respectively.

It is contemplated that after authentication of the newly delivered firmware (primary, secondary or tertiary), execution of a command to install the newly delivered firmware in order to replace the presently installed firmware (primary, secondary or tertiary) will be permitted. After installation of the newly delivered firmware, a reboot of the newly installed firmware or of the terminal 110 as a whole, will cause the newly delivered and installed firmware (primary, secondary or tertiary) to execute. Alternatively, the newly delivered firmware can modify or supplement the presently installed firmware. Execution may be initiated without rebooting the terminal 110. Newly delivered firmware (primary, secondary or tertiary), that has not been determined to be authentic, will not be permitted to be installed onto the terminal 110. The above described exemplary embodiments to install firmware enables the manufacturer of the terminal 110 to upgrade versions of firmware without relying upon (trusting) cooperation from other parties including owners or users of the terminal 110.

In some exemplary embodiments, the file header 272b includes an installation type field. The installation type field indicates whether the data is to replace or supplement previously installed data of the same type. In some exemplary embodiments, the data type field indicates that its data stores one or more cryptographic keys such as public keys. The installation type field can be used to indicate whether the newly delivered public keys supplement or replace any public keys that have been previously installed onto the terminal 110. Like other data types, this type of data (public keys) would be signed using at least two private keys. In an exemplary embodiment, the at least two private keys used to digitally sign the newly delivered key would not be used for other types of operations such as encrypting data.

Further, in some exemplary embodiments, the data stores one or more secret keys, including for example, one or more PIN encryption keys. A PIN encryption key is used to transform (encrypt) a PIN into encrypted data that is transmitted from the terminal 110 to a host computer. Like other types of data, this type of data would be signed using at least two private keys to generate at least two signatures that are stored within the file header 272*b*. Unlike other types of data, the at least two private keys are further used to encrypt the PIN encryption key into encrypted data that is stored as data 272*a* associated with the file header 272*b*. The encrypted data would later be decrypted using the at least two public keys that are associated with respect to the two private keys. Alternatively a different key can be used to encrypt.

In an exemplary embodiment, the primary firmware provides an application programming interface (API) through which a path of execution of a currently active program passes through, to perform certain programming actions. These programming actions include transferring the direction of the behavior of the CPU via executing, interpreting or processing of other data.

In some exemplary embodiments, the API includes addresses within the firmware 232*b* to perform programming actions including executing, interpreting, or processing of other data. As a result, a currently executing program cannot transfer the direction of the behavior of the primary CPU without directing its path of execution through the API and into the functions that reside within the firmware 232*b*.

In other types of exemplary embodiments, the public keys can be utilized to authenticate messages, in addition to the data carried by messages. The messages are typically communicated from other computers interoperating with the terminal 110 or via an intermediate device such as a smart card. This feature enables the terminal 110 to further authenticate the identity of other computers or persons that interoperate with the terminal 110.

The functions that reside within the firmware 232*b* are configured to determine an authentication status of the other data to be executed, interpreted, or processed. If the other data has not been determined to be authentic, the function will not perform the programming action associated with the API and will instead return an error to the currently active program. In this type of exemplary embodiment, the active program has no other way to execute, interpret, or process other data, other than that provided by the API of the firmware 232*b*.

FIG. 3A is a block diagram illustrating some of the internal components of an exemplary embodiment of a SIE terminal 130 in accordance with the invention. As shown, the SIE terminal 130 includes a central processing unit (CPU) 320, memory storing CPU addressable and executable programming and data 330, and an input/output (I/O) interface 350 which is electronically connected to a bus 310.

The input/output interface 350 is electronically connected to a keypad 352 or keyboard (not shown), a token input/output device 354, a data storage device 356 such as a disk drive 357, one or more data communications ports including a USB port 360 and an RS-232 serial port 362, and a user interface display 358. Other exemplary embodiments of the SIE terminal include other combinations and variations of device I/O, data storage and user interface hardware and may include physical and/or logical security mechanisms.

A plurality of utility programs, including a Key Generation utility, a Key Injection utility and a Signing utility can be loaded and executed in memory 330 to control the CPU 320 and the behavior of the SIE terminal 130. In an exemplary embodiment, all utility programs are secured under the principles of dual control and split knowledge for access control. Additionally, individual users may be granted varying privileges and permissions.

FIG. 3B is a block diagram illustrating an exemplary process of generating pairs of related encryption keys from a plurality of signature tokens and the process of storing a copy of each of the generated public encryption keys onto one or more fleet setup tokens 430-438 and/or into a data file.

A Key Generation utility program 450, executing on the SIE terminal 130, instructs the user(s) of the SIE terminal 130 to insert a blank USB signature token 410, into the token I/O device 354. The program 450 prompts a user to enter information constituting one or more user defined attributes of the token 410, also referred to as user defined token attributes. Other token attributes are program defined and can be initialized by the program 450 during initialization of the blank token 450.

In an exemplary embodiment, the user defined token attributes include a label and a password or PIN access code. In this use scenario, a user enters a label equal to the text string "1A" via the keypad 352 of the SIE terminal 130. The label is stored onto and associated with the token 410. As a result, the token 410 is hereafter referred to as the "1A" token 410. A user also enters an access code via the keypad 352 of the SIE terminal 130. The access code is stored securely onto and associated with the token 410. After the user defined token attributes are prompted for by the program 450 and entered by a user, the program 450 communicates an initialization command to the token 410 while it is inserted within the token I/O device 354.

In response to the initialization command, the inserted token 410 generates a private/public asymmetric cryptographic key pair and initializes other program defined token attributes. The private/public cryptographic key pair consists of a private encryption key 410*r* and public encryption key 410*u* that are related to each other and that are both stored within the "1A" token 410. The private/public cryptographic key pair is also referred to as the "1A" private/public key pair. The program 450 communicates a read command to the inserted "1A" token 410 to read a copy of the generated public encryption key 410*u* into the SIE terminal memory 330. The generated private encryption key 410*r* remains securely stored within the "1A" token 410.

Other program defined token attributes include a key authentication code (KAC). The KAC is a hash value computed using the private keys of one or more tokens forming a token use set. A token use set groups tokens that are configured to be used together. In this exemplary embodiment, a token use set will consist of two tokens. For example, tokens 1A 410 and 1B are configured to be used to generate a pair of digital signatures for signing a data. Token use set number one consists of tokens "1A" and "1B".

Next, the Key Generation utility program 450 instructs that a second blank USB signature token 412 be inserted into the token I/O device 354, if it has not been already inserted. In this exemplary embodiment, the token I/O device 354 has two ports that each accommodates one token.

As described for token "1A" 410, the program 450 prompts a user to enter information constituting one or more user defined attributes for the token 412. In this use scenario, a user enters a label equal to the text string "1B" via the keypad 352 of the SIE terminal 130. The label is stored onto and associated with the token 412. As a result, the token 412 is hereafter referred to as the "1B" token 412. A user also enters an access code via the keypad 352 and the access code is stored onto and associated with the token 412. After the user defined token attributes are prompted for by the program 450 and entered by a user, the program 450 communicates an initialization command to the token 412 while it is inserted within the token I/O device 354.

In another type of exemplary embodiment, the token I/O device 354 has only one port. In this exemplary embodiment, the Key Generation utility program 450 instructs the user(s) to remove the token 410 from the token I/O device 354 and instructs that a second blank USB signature token 412 be inserted into the token I/O device 354.

In response to the initialization command, the inserted token 412 generates a private/public cryptographic key pair and initializes other program defined token attributes. The private/public cryptographic key pair consists of a private encryption key $412r$ and public encryption key $412u$ that are cryptographically related to each other and that are both stored within the "1B" token 412. The private/public cryptographic key pair is also referred to as the "1B" private/public key pair. The program 450 communicates a read command to the inserted "1B" token 412 to read a copy of the generated public encryption key $412u$ into the SIE terminal memory 330. The generated private encryption key $412r$ remains securely stored within the "1B" token 412.

The program 450 computes a key authentication code (KAC) based upon the public key values $410u$ and $412u$ and stores the KAC value onto both tokens 410 and 412 as a program defined attribute for token use set number one 510 consisting of tokens "1A" and "1B".

The program 450 communicates a read command to the inserted "1B" labeled token to read a copy of the generated public encryption key $412u$ into the SIE terminal memory 330. The generated private encryption key $412r$ remains securely stored within the "1B" labeled token. The Key Generation utility program 450 instructs that the "1B" labeled token 412 and any other token 410, to be removed from the token I/O device 354. As a result, the initialization of tokens 1A 410 and 1B 412 of the first token set 510 is complete.

Tokens may be grouped into token sets having at least two individual tokens and where each individual token is in the secure possession of a unique individual. For example, the tokens 1A and 1B are tokens within the token set number one. The token 1A is in the secure possession of one person, such as a security officer. The token 1B is in the secure possession of another person, such as a software development manager. Only the security officer knows the password of token 1A and only the software development manager knows the password of the token 1B. Both the security officer and the software development manager must co-operate to digitally sign a data. This type of security arrangement is referred to as "dual control".

The above described procedure is repeated for the signature tokens within the token sets two through five 514-526. As a result, all of the signature tokens 410-428 are initialized and the public encryption keys $410u$-$428u$ are now stored into the SIE terminal memory 330. The program 450 then instructs the users that all the signature tokens 410-428 are to be stored in a secure place.

Next, the Key Generation utility program 450 instructs the users to insert a blank fleet token 430 into the token I/O device 354. The token 430 is also labeled as token "Fleet-A" and is here after also referred to as the "Fleet-A" token 430. As described for token "1A" 410, the program 450 prompts a user to enter information constituting one or more user defined attributes for the token 412. In an exemplary embodiment, the user defined token attributes include a label and an access code. The program 450 then stores a copy of each of the public encryption keys $410u$-$428u$ onto the "Fleet-A" labeled token 430.

Optionally, the program 450 also stores a copy of each of the public encryption keys $410u$-$428u$ onto on a data storage device 357. The program 450 then instructs that the "Fleet-A" labeled token 430 be removed from the token I/O device 354 and stored in a secure place. The public encryption keys $410u$-$428u$ can be later retrieved from the one or more fleet tokens and/or the data file for injection into the terminal 110 as described in association with FIG. 3D.

FIG. 3C is a table listing the data of (5) token sets 510-526 with respect to individual tokens and encryption keys. Each token set 510-526 can include one or more tokens. In this exemplary embodiment, each token set 510-526 includes (2) tokens.

The token set 510 includes tokens 410 and 412, token set 514 includes tokens 414 and 416, token set 518 includes tokens 418 and 420, token set 522 includes tokens 422 and 424 and token set 526 includes tokens 426 and 428. Tokens of each token set are indexed with a combination of the token set identifier (1-5) and the letters A or B. Hence, token 410 is referred to as token 1A, token 412 as token 1B, token 414 as token 2A, token 416 as 2B, token 418 as 3A, token 420 as 3B, token 422 as 4A, token 424 as 4B, token 426 as 5A and token 468 is referred to as token 5B.

Transaction terminals 110 typically require data to be signed by two private encryption keys. For this type of exemplary embodiment, the two private keys are stored within one token key set. A data can be signed using tokens 1A and 1B, tokens 2A and 2B, tokens 3A and 3B, tokens 4A and 4B or tokens 5A and 5B. Unused key pairs function as backup key pairs in circumstances where one or more key pairs are lost or compromised.

FIG. 3D is a block diagram illustrating a SIE terminal injecting public encryption keys $410u$-$428u$ of all available signature tokens 410-428 to the firmware $232b$ of a PED financial transaction terminal 110.

A Key Injection utility program 460, executing on the SIE terminal 130, instructs that the first fleet token 430 be inserted into the token I/O device 354. The Key Injection Utility prompts for one or more passwords at initiation. The program 460 communicates a read command to the inserted fleet token 430 token to read a copy of the generated public encryption keys $410u$-$428u$ from the fleet token 430 into memory 330 of the SIE terminal 130.

The Key Injection utility program 460 then prompts the user to confirm that the public encryption keys $410u$-$428u$ are to be injected into the transaction terminal 110. Upon confirming, the Key Injection utility program 460 communicates and injects the public encryption keys to the transaction terminal 110 via the communication link $116b$ (FIG. 1C). In an exemplary embodiment, injection related commands are also communicated by the SIE terminal 130 to the firmware $232b$ to perform injection of the public encryption keys $410u$-$428u$. Upon successful injection of the public encryption keys $410u$-$428u$, the transaction terminal 110 will here after be enabled to authenticate data using the public encryption keys $410u$-$428u$.

In other exemplary embodiments, the storage of the public encryption keys $410u$-$428u$ is divided between multiple fleet tokens 430-438. Input of all of the public encryption keys $410u$-$428u$ requires all of the fleet tokens 430-438 to be individually inserted into the token I/O device and read separately. In this type of exemplary embodiment, each of a plurality of trusted users is responsible for the safe keeping of each of one or more of the fleet tokens 430-438. Each individual token set 510-526 can be divided among a plurality of trusted users. Another embodiment is that all public encryption keys are stored in multiple fleet tokens.

FIG. 3E is a block diagram illustrating an exemplary embodiment of the SIE terminal signing data using the private encryption keys of each of the signature tokens 1A and 1B of token set one 510. In this exemplary embodiment, the Data Signing Utility program 470, executing within CPU addressable memory 330 of the SIE terminal 130, prompts the one or more users(s) of the SIE terminal 130 to identify one or more data files for signing. The user(s) identify one or more data files 272a residing within the data storage 357 of the SIE terminal 130. Alternatively, the user(s) can identify a folder of one or more data files for signing. In this exemplary embodiment, only one procedural (executable or script) data file 272a is signed at any one time. In other embodiments, the data to be signed can reside outside the data storage 357 of the SIE terminal 130 and be provided to the SIE via a communications interface such as a network connection or portable media.

Next, the SIE terminal 130 prompts the user(s) to insert a first signature token into the token I/O device 354 and to input a first access code value associated with the first signature token. In this use scenario, the user(s) insert the signature token 1A 410 and input an access code value equal to the access code value stored onto token 1A 410. The SIE terminal 130 verifies the token is valid for use in the signing process, including the presence of a private encryption key 410r, an access code value (not shown) and a key authentication code (KAC) (not shown) from token 1A 410 and verifies that the first access code value inputted by the user(s) is equal to the access code value stored onto token 1A.

Next, the SIE terminal 130 prompts the user(s) to insert a second signature token into the token I/O device 354 and to input a second access code value associated with the second signature token. In this circumstance, the user(s) insert the signature token 1B 412 of the token set one 510 and input a second access code value equal to the access code value stored onto token 1B 412. The SIE terminal 130 verifies the token is valid for use in the signing process, including the presence of a private encryption key 412r, an access code value (not shown) and a key authentication code (KAC) (not shown) from token 1B and verifies that the second access code value inputted by the user(s) is equal to the access code value stored onto token 1B.

The SIE terminal 130 also verifies that the KAC read from token 1A and the KAC read from token 1B are correct, indicating that both token 1A and token 1B are members of the same token set, in this circumstance, token set number one 510 (FIG. 3D). Both tokens 1A and 1B are now ready to perform data signing.

Token 1A provides a first private encryption key 410r which is used in conjunction with data file 272a to create a first digital signature by executing a digital signature algorithm. Next, the token 1B provides a second private encryption key 412r which is used in conjunction with data file 272a to create a second digital signature by executing the digital signature algorithm. The data signing utility program 470 then completes generation of the other portions of the file header 272b and adds the file header 272b to the data file 272a and stores the data file header 272b and the data of the file 272a into a newly created signed data file. Next, the signed data 272a and secure header 272b are communicated to the transaction terminal 110 via the communications link 116b. The transaction terminal 110 stores the signed data 272a and secure header 272b into its memory 270 and queues the signed data 272a and secure header 272b for authentication and flags the signed data 272a and secure header 272b as being pre-authenticated. Optionally, the signed data 272a and secure header 272b are stored and later communicated to the transaction terminal 110 via the communications link 116b.

It is to be noted that the term "header" is used herein to describe a portion of file which contains certain information. The allocated space in memory for the header is not restricted to any particular location.

Next, the transaction terminal attempts to authenticate the signed data 272a, 272b as described in association with FIG. 2B. If authentication is unsuccessful, the signed data 272a, 272b is flagged as being restricted from directing the CPU 220 of the transaction terminal 110. In one exemplary embodiment, the signed data 272a, 272b is removed from the transaction terminal 110. If successfully authenticated, the signed data 272a, 272b is flagged as being unrestricted from directing the CPU 220 of the transaction terminal 110 and is available to execute and direct the CPU 220 when direction of the CPU 220 transitions from the firmware 232b or other unrestricted digital logic directing the CPU 220 to the digital logic of the data 272a, 272b. Alternatively, the signed data can be authenticated as it is received and stored or not stored in accordance with the results of the authentication.

The system of the invention provides for deactivating (disabling) a token use set without requiring the generation and/or injection (re-keying) of new cryptographic keys. In some circumstances, one or more tokens of a token use set may be lost or stolen, or be in the possession of persons that are no longer trusted by those persons responsible for the security of one or more transaction terminals and/or the security of other components of the system. If active tokens remain that are not compromised, the system is said to be "partially compromised".

The transaction terminal 110 is configured to remove public keys of one or more token use sets that have been previously injected into the transaction terminal 110. Removal or deactivation of the public keys effectively deactivates (disables) the use of tokens storing the related private keys. An advantage of "2 of N" signing and authentication is that there are other (N−2) other previously injected cryptographic keys that remain active (enabled) and ready for use without requiring the generation and/or injection of new cryptographic keys.

If all N active public keys are removed from a transaction terminal 110, the terminal 100 no longer authenticates incoming data, and the system is said to be "fully compromised". While no new data can be loaded to the terminal, it can continue to operate with the previously authenticated data. As a result, generation and injection of other cryptographic keys restores dual signature security within the transaction terminal 110. In the preferred embodiment, new public keys can be loaded to the terminal remotely using a previously established secure mechanism.

As a result, a key escrow management system providing backup (escrow) and recovery (retrieval) of cryptographic keys lost or compromised from the primary token use set is not required. A trusted key repository for archival and later retrieval of cryptographic keys to replace a currently active token use set with another newly activated token use set is not required either.

A token use set consisting of two keys provides dual control of key generation, signing and authentication. A token use set consisting of three keys can provide triple control. A token use set of four keys can provide quadruple control of key generation, signing and authentication and so on.

The KAC is a security mechanism that prevents a key from one token use set from being used in combination with a key from another token use set. Tokens from the same token use set are intentionally placed under the control of separate and trusted persons to reduce the likelihood that one person could possess a complete token use set.

To generate a digital signature, a person is required to have physical possession of a currently activated token and required to input a correct access code value into the SIE terminal 130. Possession of an activated token, by itself, is not sufficient to initiate the process or to generate a correct digital signature. Knowledge of a correct access code value, by itself, is not sufficient to generate a correct digital signature. This characteristic of the system of the invention is referred to as "two factor access control".

To correctly sign a data file, two persons are each required to have physical possession of a different and currently activated token within the same token use set and are each required to input a correct access code value into the SIE terminal 130 that is associated with each respective token of the active token use set. This characteristic of the system of the invention is referred to as "split knowledge and dual control".

The tokens are referred to as "secure" because each token stores and protects information including a private key and an access code value. Additionally, the tokens may have other mechanisms such as physical security attributes that seek to prevent tampering including disclosure of access codes and keys. A token may be a physical or electronic or software entity, and may include such things as smart cards, tamper resistant security modules (TRSM), USB devices, etc. In other exemplary embodiments, the requirement for related key sets can be removed allowing any 2 of n keys to be used. In another embodiment, the KAC mechanism could be shared across all tokens allowing any two or more tokens to be used together.

FIGS. 4A-4E illustrate aspects of an embodiment of the PED financial transaction terminal 110 of FIGS. 1A-1C. In this embodiment, the financial transaction terminal may be configured as a retail purchase transaction terminal or as a price verifier.

A housing 105 of the transaction terminal 110 is configured for portability so that the transaction terminal 110 can be moved from location to location. The housing is further configured to be replaceably mounted on a fixed structure such as a fixed structure of a cashier station or a fixed structure of the retail store floor (e.g., a shelf, a column).

Figure 4A:
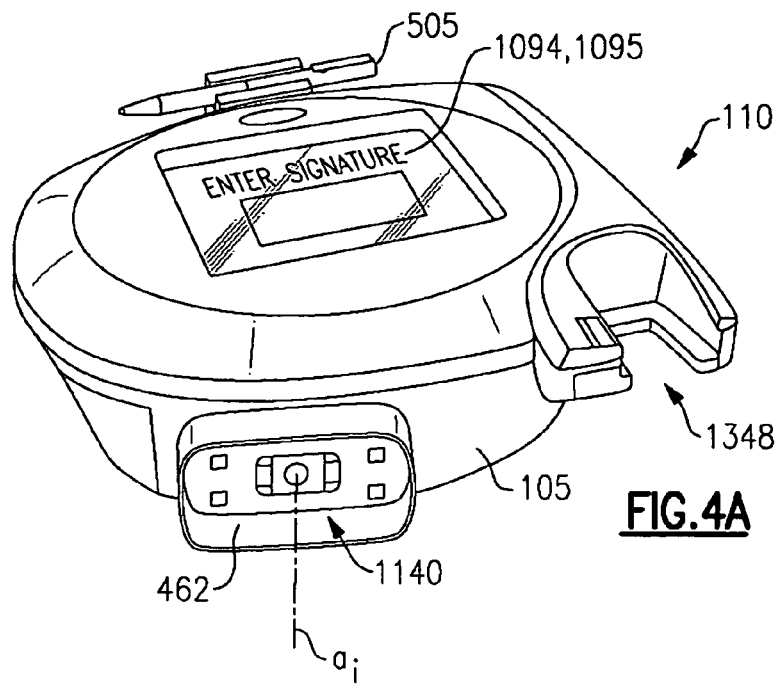
FIG. 4A is a top perspective view of an embodiment of the PED transaction terminal of FIGS. 1A-1C.
Figure 4B:
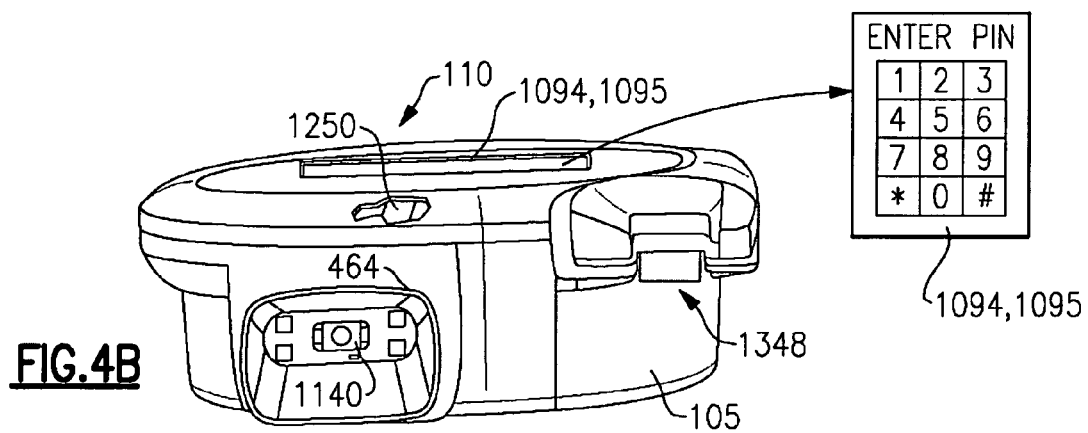
FIG. 4B is a side view of an embodiment of the PED transaction terminal of FIG. 4A.

The transaction terminal 110 includes a display 1094 (FIGS. 4A-4B) having an associated touch screen overlay 1095, an imaging assembly (module) 1140 (FIG. 4E) having an imaging axis, a (FIG. 4A), and a card I/O (card reader) port 1348 having a physical dimensions that are partially defined by the physical dimensions of the card I/O (card reader) 254 (FIG. 2B), 1350 (FIG. 4E) and partially defined by housing 105. The transaction terminal 110 further includes a luminous shroud 464 (FIG. 4B). When light from imaging assembly (module) 1140 strikes luminous shroud 464, the luminous shroud glows 464.

The display 1094 optionally has an associated touch screen overlay 1095 so that the display 1094 operates as a data input interface to the terminal 110. The combination of the display 1094 and the touch screen overlay 1095 is also referred to as a "touch screen" 1095. In some operating modes, the display 1094 outputs a PIN entry screen for prompting a customer to enter PIN information into the touch screen overlay 1095. In other operating modes, as shown in FIG. 4A, the display 1094 outputs a signature prompt screen prompting a customer (user) to enter signature information into the terminal 110 with use of a stylus 505 (FIG. 4A). The touch screen 1095 and/or a keyboard can be used for selecting between modes of operation of the terminal 110 in addition to entering data into the terminal 110.

Figure 4C:
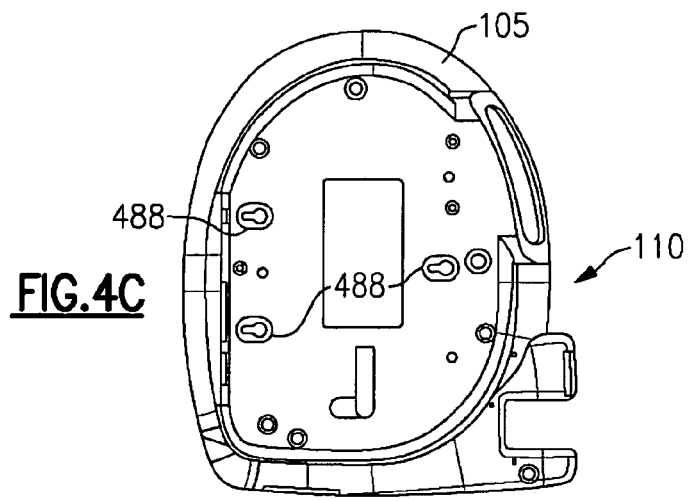
FIG. 4C is a bottom view of the PED transaction terminal of FIGS. 4A-4B.
Figure 4D:
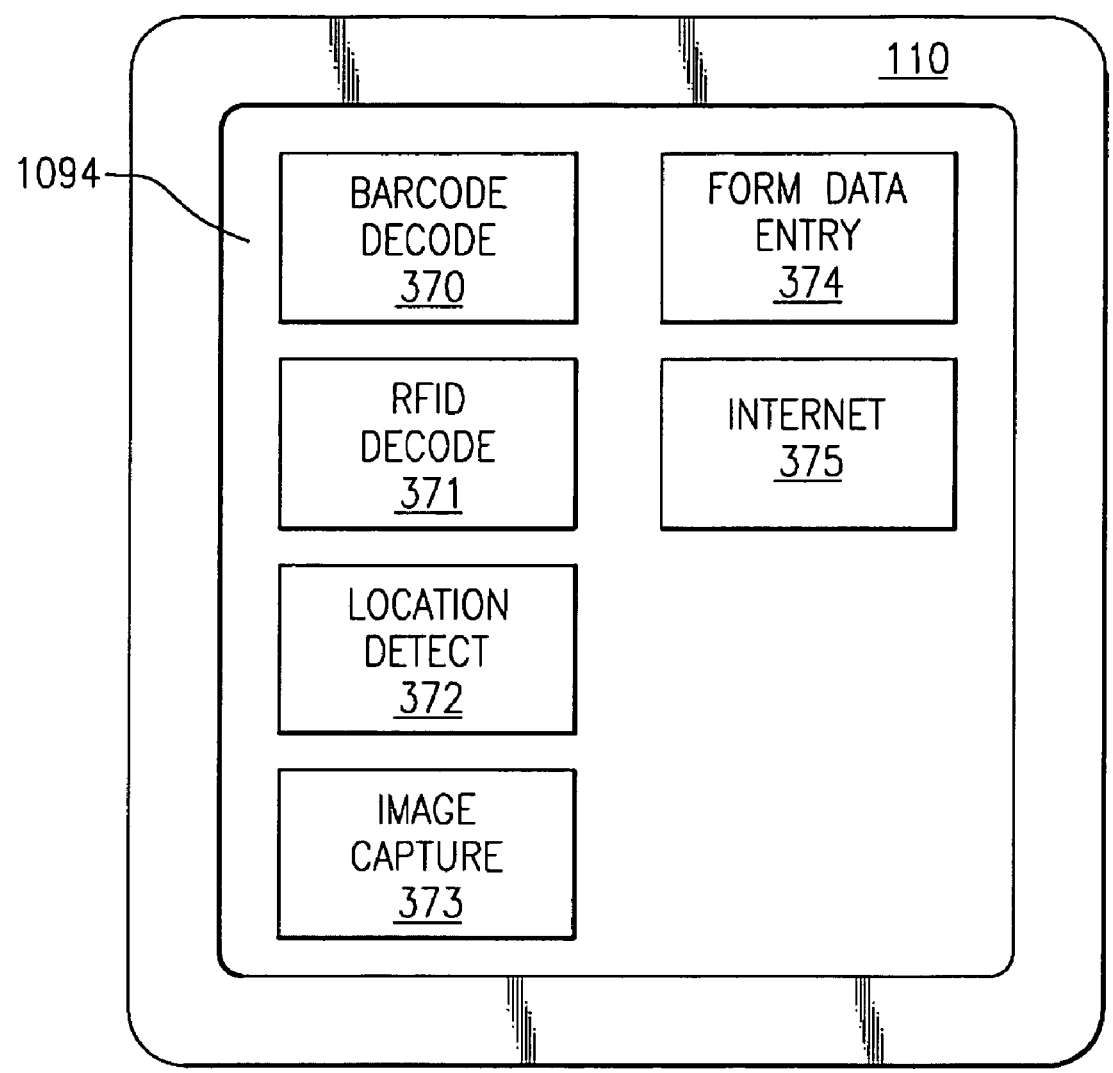
FIG. 4D is illustrates a plurality of selectable icons output onto the image display of the transaction terminal of FIGS. 4A-4C.
Figure 4E:
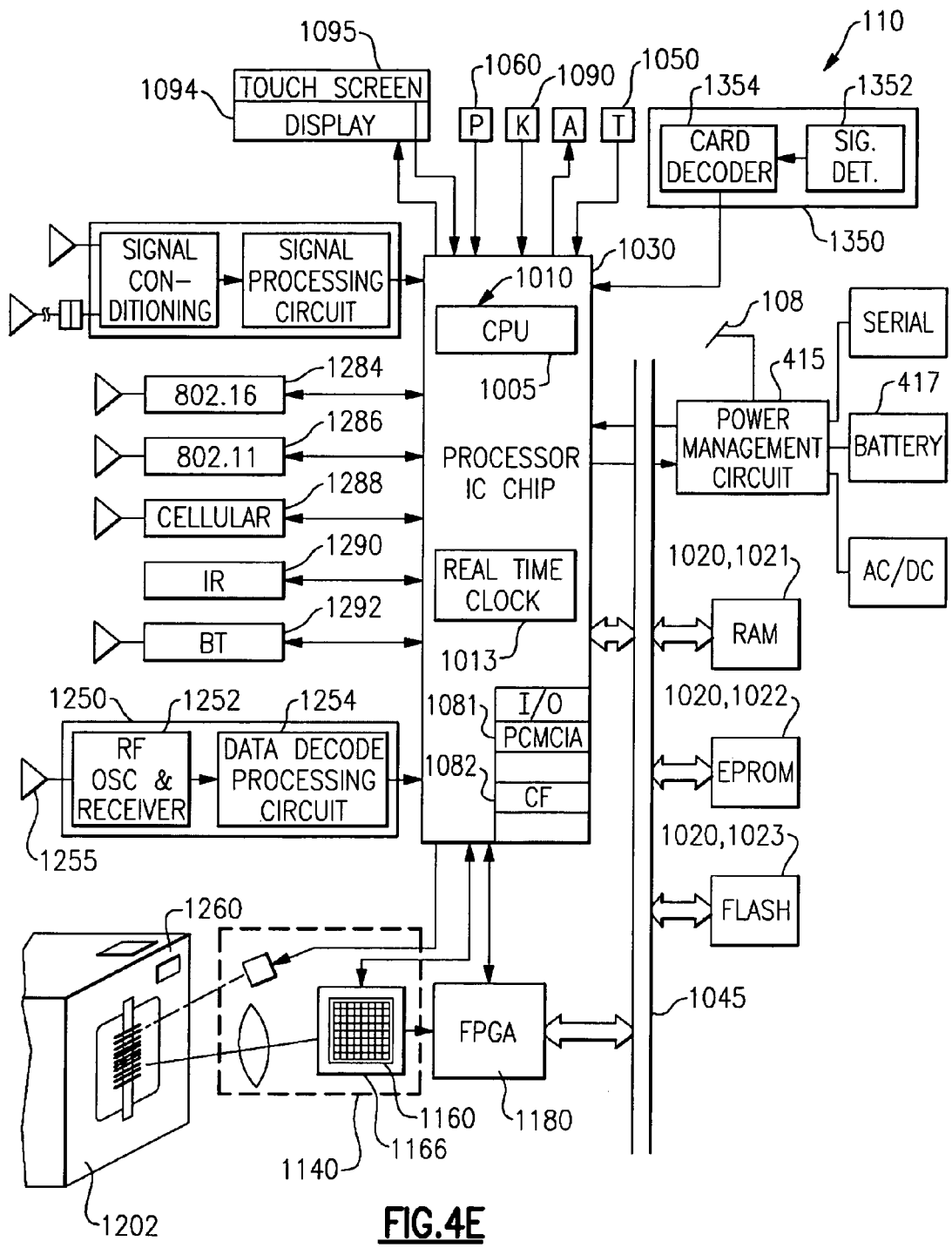
FIG. 4E is a block diagram illustrating a plurality of internal components residing within a housing of the PED transaction terminal of FIGS. 4A-4C.

Referring to FIGS. 4C-4E, the housing 105 of the transaction terminal 110 has formations 488 (FIG. 4C) facilitating the replaceable mounting of the transaction terminal 110 onto a surface of a fixed structure. Selection of various modes of operation (FIG. 4D) may be made with use of a graphical user interface (GUI). A plurality of components (FIG. 4E) of the transaction terminal 110 are implemented on circuit boards located within the housing 105 of FIGS. 4A-4C.

Referring to FIG. 4D, the GUI can be displayed onto the display 1094 and can include a plurality of control buttons in the form of selection icons 370-375, such as bar code decoding icon 370, and RFID decoding icon 371, location detection icon 372, image capture icon 373, a form data entry icon 374 and an Internet (web browsing) icon 375. Many operating systems, such as WINDOWS CE, GNU/Linux, and Symbian support such GUI functionality. Selection of one of the icons 370-375, transitions the transaction terminal 110 into a mode of operation corresponding to the selected icon. In some embodiments, a pointer controller, also referred to as a mouse, can be used to move a pointer that is output onto the display 1094.

When the Internet icon is selected, the transaction terminal 110 is driven into a web browsing mode of operation. The transaction terminal 110 can incorporate a web browser for enabling the terminal 110 to be utilized for navigating between websites disposed within various servers of the Internet. Available web browser software packages for hand held devices include for example, Opera for Mobile by Opera Software, Netfront by Access, and Minimo by the Mozilla Foundation, WebPro 1.0 by Novarra, and/or WinWAP, available from Slob-Trot Software, Inc. and Pocket Internet Explorer available from Microsoft, Inc.

The selection of bar code decoding icon 370 transitions the terminal 110 into a bar code reading mode of operation such that an actuation of trigger 1050 (FIG. 4E) subsequent to a bar code decode mode being selected results in control circuit 1010 (FIG. 4E) capturing an electronic image representation, subjecting the electronic image representation to a decode attempt and automatically outputting a decoded message (e.g., a decoded message is one or more of (i) displayed on display 1094 (ii) stored into memory 1021, 1023, and/or (iii) uploaded to another remote device, such as a remote computer that is accessible via a communications network.

When trigger button 1050 (FIG. 4E) is actuated with terminal 110 in a bar code reading mode of operation, control circuit 1010 automatically sends appropriate control signals to image sensor chip 1166. Image sensor chip 1166 in response thereto automatically exposes photosensitive pixels of image sensor 1160 to light and generates image signals. The image signals are thereafter automatically converted into digital values by image sensor IC chip 1166. The digital values are received by FPGA 1180 and transferred into RAM 1021 to capture an electronic image representation of a substrate 1202 carrying a bar code symbol 1204.

In accordance with a bar code decoding program stored in ROM 1022, control circuit 1010 may attempt to decode a bar code symbol represented in the captured electronic image representation. The capture of image data and decoding of image data occur automatically in response to a trigger signal being generated. A trigger signal can be generated when trigger 1050 is actuated. Control circuit 1010 may be configured to continuously capture image data and attempt to decode bar code symbols represented therein as long as trigger 1050 is actuated. The electronic image representation captured into RAM 1021 may be an image map having a pixel value (grey scale, color scale) for each pixel of the image sensor.

Selection of an RFID decoding icon 371 transitions the terminal 110 into an RFID decode mode of operation such that an actuation of trigger 1050 (FIG. 4E) subsequent to a selection of an RFID decode mode results in control circuit 1010 (FIG. 4E) controlling RFID reader unit 1250 to broadcast a radio frequency signal in attempt to activate RFID tags in a vicinity of terminal 110, automatically decoding an RFID tag encoded message carried by a received signal utilizing RFID reader unit 1250, and automatically outputting a decoded RFID tag message, e.g., to display 1094 and/or to communicate to another computer.

The RFID reader unit 1250 (FIG. 4E) includes an RF oscillation and receiver circuit 1252 and a data decode processing circuit 1254. The RFID reader unit 1250 may be configured to read RF encoded data from a passive RFID tag, such as tag 1260, which may be disposed on article 1202. Where RFID reader unit 1250 is configured to read RF encoded data from a passive RFID tag 1260, RF oscillation and receiver circuit 1252 transmits a carrier signal from antenna 1255 to passive tag 1260. Passive RFID tag 1260 converts the carrier energy to voltage form and a transponder of tag 1260 is actuated to transmit a radio signal representing the encoded tag data. RF oscillator and receiver circuit 1252, in turn, receives the radio signal from the tag and converts the data into a processable digital format. Data decode processing circuit 1254, typically including a low cost microcontroller IC chip, decodes the received radio signal information received by RF oscillator and receiver circuit 1252 to decode the encoded identification data originally encoded into RFID tag 1260.

Selection of the image capture icon 373 transitions the terminal 110 into a picture taking mode of operation such that a subsequent actuation of trigger 1050 (FIG. 4E) results in control circuit 1010 automatically capturing a two-dimensional electronic image representation corresponding to the present field of view of imaging assembly (module) 1140 and automatically outputting the two-dimensional electronic image representation into one or more of (i) a memory of the terminal 110, e.g., memory 1021-1023 (ii) another computer and/or (iii) display 1094, as described previously herein without decoding being executed and without a decoded message being output.

The terminal 110 can be configured so that icons 370, 371, 373 operate as triggers as well as mode selections. The terminal 110 can be configured so that actuation (selection) of one of the icons 370, 371, 373 results in a generation of a trigger signal and an associated operating mode being activated (initiated) such that there is no need to separately actuate trigger 1050 after an icon 370, 371, 373 is actuated (selected).

Referring to FIG. 4E, the terminal 110 may further include a plurality of communication links such as an 802.16 communication link 1284, 802.11 communication link 1286, a communication link 1288 for communication with a cellular network such as a network in accordance with the Global System for Mobile Communications (GSM), a Bluetooth communication link 1292, and an IR communication link 1290 facilitating communication between terminal 110 and another device located separately from the terminal 110. The terminal 110 may reside on a network, such as a local area network ("LAN") including separately located and separately housed server processors and other hand held devices.

In one embodiment, the network is a GSM network that supports packet based wireless communication in accordance with the General Packet Radio Service (GPRS). In another embodiment, the network is a CDMA network. The cellular radio 1288 can be a CDMA type of radio that connects to any CDMA network, including, but not limited to, Qualcomm's CDMA2000 1xRTT, CDMA2000 1xEV-DO, or W-CDMA/UMTS networks. The aforementioned cellular networks all support high-speed packet based wireless data transfer.

In addition to having wireless communication links, the terminal 110 may include various physical connector interfaces such as a "D-connector" interface enabling hard wired RS 232 communication with host processor 1310, and USB physical connection interface enabling USB communication with devices of a network. The terminal may further be in communication with a plurality of offsite remote host processors or servers located several miles to thousands of miles away from the terminal 110. Remote host processors may be in communication with the terminal via a wide area network, such as the Internet.

In the embodiment of FIG. 4E, control circuit 1010 includes a central processing unit or CPU 1005. CPU 1005 may be disposed on processor IC chip 1030, while memory 1020 may be incorporated partially in IC chip 1030 and partially in a plurality of memory IC chips such as EPROM IC chip 1022, RAM IC chip 1021, and flash IC chip 1023. EPROM IC chip 1022, RAM IC chip 1021, and flash IC chip 1023 or other nonvolatile storage device may be in communication with microprocessor IC chip 1005 via system bus 1045.

The terminal 110 also includes a keyboard 1090 and a pointer controller 1060 enabling movement of a pointer. In some embodiments, the pointer controller 1060 is provided by an arrow navigation matrix. The pointer controller 1060 may also be provided by, e.g., a trackball mouse or a joystick. The IC chip 1030 may include a real time clock 1013, a plurality of serial I/O interfaces such as general purpose I/O, USB, and Ethernet interfaces and a plurality of parallel interfaces such as PCMCIA (PC) 1081 and Compact Flash (CF) memory 1082.

FIG. 5 is a flowchart for restricting access to a computing device in accordance with the invention, which begins in a step 510 with entering data or providing data to a first device. In a step 512 the data is passed through a hash function or algorithm to yield a hash value.

In cryptography, a cryptographic hash function or hash algorithm is a function for summarizing or probabilistically identifying data. Such a summary is known as a hash value or simply a hash, and the process of computing such a value is known as hashing. A hash function takes a file or message of any length as input and produces a fixed length string as output, sometimes termed a message digest or a digital fingerprint. A property of hash functions is that if two hashes (according to the same function) are different, then the two inputs were different in some way. Suitable hash algorithms for the present invention include SHA (Secure Hash Algorithm) or MD5 (Message Digest 5), etc.

The hash value is encrypted in a step 514, using at least two cryptographic keys such as with the private keys of asymmetric pairs (e.g. RSA key pairs). This encrypted hash value is referred to as a "digital signature". The digital signature and data file is sent to a second device in a step 516.

In a step 518, the digital signature is decrypted using at least two paired cryptographic keys associated with the initial cryptographic keys.

In a step 520, the data file is passed thru the hash algorithm at the second device to generate a second device hash value.

In a step 522, the first device hash value is compared to the second device hash value.

A query is made in a step 524 whether the second device hash value is equal to the first device hash value. If the values are equal, the second device may proceed in a step 526 with one or more transactions that may or may not involve the data file. These transactions might involve such things as executing programs, interpreting data, processing data, displaying data, transferring data, etc. If the values are not equal, the second device is prevented from proceeding in a step 528 with one or more transaction steps such as those mentioned.

Figure 6:
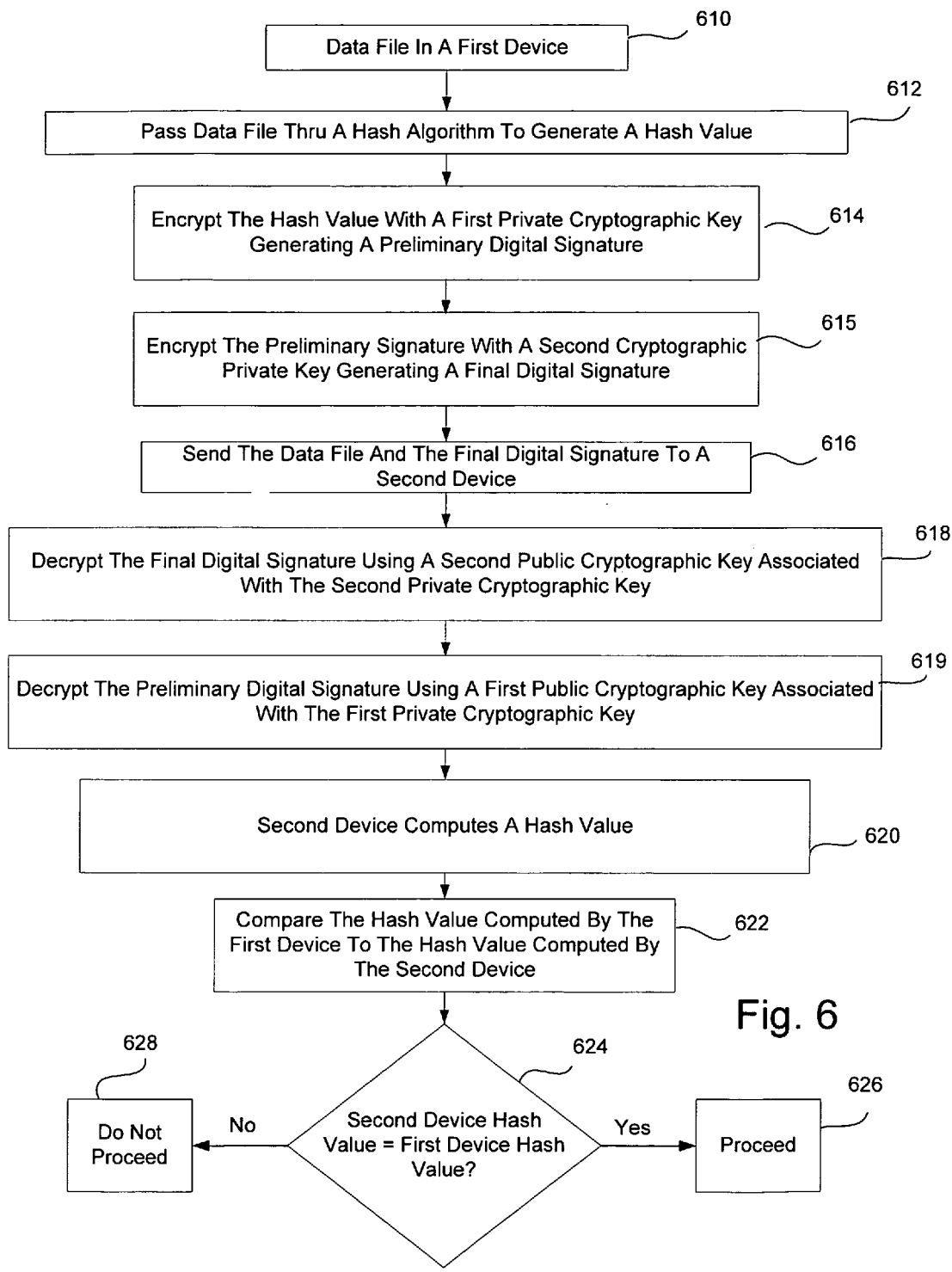
FIG. 6 is a flowchart for restricting access to and control of a computing device in accordance with the invention.

FIG. 6 is a flowchart for restricting access to a computing device in accordance with the invention, which begins in a step 610 with entering data or providing data to a first device. In a step 612 the data is passed through a hash function or algorithm to yield a hash value.

The hash value is encrypted in a step 614, using a first cryptographic key, thereby generating a preliminary digital signature.

The preliminary signature is then encrypted with a second cryptographic key in a step 615 to thereby generate a final digital signature.

The digital signature and data file are sent to a second device in a step 616.

A step 618, decrypt the final digital signature using a second public cryptographic key associated with the second private cryptographic key.

A step 619 decrypts the preliminary digital signature using a first public cryptographic key associated with the first private cryptographic key.

In a step 620, a second device computes a hash value.

A step 622 compares the hash value computed by the first device to the hash value computed by the second device.

A query is made in a step 624 whether the second device hash value is equal to the first device hash value. If the values are equal, the second device may proceed in a step 626 with one or more transactions that may or may not involve the data file. These transactions might involve such things as executing programs, interpreting data, processing data, displaying data, transferring data, etc. If the values are not equal, the second device is prevented from proceeding in a step 628 with one or more transaction steps such as those mentioned.

While the present invention has been particularly shown and described with reference to the preferred mode as illustrated in the drawing, it will be understood by one skilled in the art that various changes in detail may be effected therein without departing from the spirit and scope of the invention as defined by the claims.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred exemplary embodiments have been described as being implemented in software, in other exemplary embodiments hardware or firmware implementations may alternatively be used, and vice-versa.

In view of the wide variety of exemplary embodiments to which the principles of the present invention can be applied, it should be understood that the illustrated exemplary embodiments are exemplary only, and should not be taken as limiting the scope of the present invention. For example, the steps exemplified herein and the flow diagrams may be taken in sequences other than those described, and more, fewer or other elements may be used. Also, unless applicants have expressly disavowed any subject matter within this application, no particular exemplary embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all exemplary embodiments that come within the scope and spirit of the following claims and equivalents thereto are claimed as the invention.

I claim:

1. A method for authenticating data comprising the steps of:
   selecting at least two initial cryptographic keys from within a larger set of N cryptographic keys stored in a first device;
   providing data to the first device;
   generating authentication information required to authenticate the data utilizing the selected initial cryptographic keys;
   sending the data and authentication information to a second device having paired cryptographic keys wherein each paired cryptographic key is associated to one of the at least two initial cryptographic keys;
   authenticating the data in the second device utilizing the paired cryptographic keys; and,
   selecting at least one other cryptographic key from the set of N cryptographic keys if one of the selected initial cryptographic keys has been compromised.

2. A method for authenticating data comprising the steps of:
   providing data to a first device having at least two initial cryptographic keys;
   generating authentication information required to authenticate the data utilizing the at least two initial cryptographic keys;
   sending the data and authentication information to a second device having paired cryptographic keys wherein each paired cryptographic key is associated to one of the at least two initial cryptographic keys; and,
   authenticating the data in the second device utilizing the paired cryptographic keys.

3. A method in accordance with claim 2, wherein the paired cryptographic keys are stored on a secure token.

4. A method in accordance with claim 3, wherein the second device includes a token reader for reading the paired cryptographic keys.

5. A method in accordance with claim 2, wherein the authenticated data is used in the operation of a transaction terminal.

6. A method in accordance with claim 2, wherein the authentication data is used in the operation of a point of sale transaction terminal.

7. A method in accordance with claim 2, further comprising sending the authenticated data to a third device in a secure transaction.

8. A method in accordance with claim 2, wherein the paired cryptographic keys are stored in memory in the second device.

9. A method in accordance with claim 2, wherein the paired cryptographic keys are stored in a mass storage unit in the second device.

10. A method in accordance with claim 2, wherein the paired cryptographic keys are stored in a third device and transmitted to the second device.

11. A method in accordance with claim 2, wherein the paired cryptographic keys are transmitted to the second device from the first device as a separate transmission.

12. A method in accordance with claim 2, wherein the paired cryptographic keys are derived from other data.

13. A method in accordance with claim 2, wherein the other data is resident in either the first or second device.

14. A method in accordance with claim 2, wherein the other data is provided to the second device from the first device.

15. A method in accordance with claim 2, wherein the paired cryptographic keys are communicated to the second device from a secure information entry device.

16. A method in accordance with claim 2, wherein the paired cryptographic keys are communicated to the second device over a network.

17. A method in accordance with claim 2, wherein the paired cryptographic keys are communicated to the second device over a secure network.

18. A method in accordance with claim 2, wherein the paired cryptographic keys are communicated to the second device over a wired communications link.

19. A method in accordance with claim 2, wherein the paired cryptographic keys are communicated to the second device over a wireless communications link.

20. A method in accordance with claim 2, wherein the second device is configured to not execute, not interpret, not process and not allow transfer of data if the paired cryptographic keys have not been provided to the second device.

21. A method in accordance with claim 2, wherein if the paired cryptographic keys are not properly associated with the initial cryptographic keys, the second device will not execute, interpret, process or allow transfer of data in the data file.

22. A method in accordance with claim 2, wherein the second device includes firmware having access to the paired cryptographic keys.

23. A method in accordance with claim 22, wherein the firmware is pre-authenticated before being installed onto the second device.

24. A method in accordance with claim 2, wherein the data file comprises at least one of the following: graphics; audio; multimedia; biometric; payment; access requests; identity; contracts; credit; debit; parameter; sampling; textual; executable programs; cryptographic; software; communications; random number; and initiation data.

25. A method in accordance with claim 2, wherein both the first device and the second device are capable of sending data to be authenticated and authenticating data utilizing paired cryptographic keys.

26. A method in accordance with claim 2, wherein the first device sends data and authenticating data files to a plurality of second devices.

27. A method in accordance with claim 2, wherein the second device has at least two second device initial cryptographic keys, comprising the further steps of:
   generating authentication data required for data authentication utilizing the at least two second device initial cryptographic keys;
   sending the data and authentication data to a third device having paired cryptographic keys wherein each paired cryptographic key is associated to one of the at least two second device initial cryptographic keys; and,
   authenticating the data in the third device utilizing the paired cryptographic keys.

28. A method in accordance with claim 2, wherein the data includes information regarding which paired cryptographic keys are to be used for authenticating data.

29. A method in accordance with claim 2, wherein the authentication data includes information regarding which paired cryptographic keys are to be used for authenticating data.

30. A method in accordance with claim 2, wherein at least one of the initial cryptographic keys is generated by at least one of the following; processing data from an source external to the device; a random number or pseudo random number generator; and extracting data present in the data.

* * * * *